United States Patent
Baba et al.

(10) Patent No.: US 9,130,416 B2
(45) Date of Patent: Sep. 8, 2015

(54) COIL, STATOR, AND METHOD FOR MANUFACTURING COIL

(75) Inventors: Satoru Baba, Kariya (JP); Yasuyuki Satake, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 438 days.

(21) Appl. No.: 13/368,061

(22) Filed: Feb. 7, 2012

(65) Prior Publication Data

US 2012/0200191 A1    Aug. 9, 2012

(30) Foreign Application Priority Data

Feb. 9, 2011    (JP) ................................ 2011-026305
Dec. 9, 2011   (JP) ................................ 2011-270507

(51) Int. Cl.
*H02K 3/04* (2006.01)
*H02K 3/12* (2006.01)
*H02K 15/04* (2006.01)

(52) U.S. Cl.
CPC .. *H02K 3/12* (2013.01); *H02K 3/04* (2013.01); *H02K 15/0464* (2013.01); *Y10T 29/49009* (2015.01)

(58) Field of Classification Search
CPC .................................. H02K 3/04; H02K 3/12
USPC .......... 310/170, 180, 195, 198, 201, 206, 208
IPC ....................................................... H02K 3/04
See application file for complete search history.

(56) References Cited

U.S. PATENT DOCUMENTS

| 4,376,904 A * | 3/1983 | Horrigan ....................... 310/208 |
| 6,700,282 B2 * | 3/2004 | Mori et al. .................... 310/208 |
| 6,703,750 B2 * | 3/2004 | Nakamura ..................... 310/184 |
| 2005/0073208 A1 | 4/2005 | Mitcham |
| 2007/0052316 A1 | 3/2007 | Mitcham |
| 2008/0036323 A1 | 2/2008 | Georg et al. |

(Continued)

FOREIGN PATENT DOCUMENTS

| CN | 101228599 A | 7/2008 |
| CN | 101615508 A | 12/2009 |

(Continued)

OTHER PUBLICATIONS

Machine Translation, FUKUSHIMA, JP 2008245489 A, Oct. 9, 2008.*

*Primary Examiner* — Thomas Truong
(74) *Attorney, Agent, or Firm* — Sughrue Mion, PLLC

(57) ABSTRACT

A coil including a first winding portion and a second winding portion arranged on a stator of a rotary electrical machine. The first winding portion is formed by edgewise-winding a conductive rectangular wire. The second winding portion is formed by edgewise-winding a conductive rectangular wire, which is connected to the first winding portion. Coil end parts of the first and second winding portions each include a crank-shaped section. The first and second winding portions are formed so that when slot insertion parts of the first and second windings are arranged in slots of the stator, a long side of a cross-section of the rectangular wire extends in the circumferential direction of the stator and a short side of the cross-section of the rectangular wire extends in a radial direction of the stator.

10 Claims, 18 Drawing Sheets

(56) References Cited

U.S. PATENT DOCUMENTS

| | | |
|---|---|---|
| 2008/0093948 A1* | 4/2008 | Naganawa .................... 310/203 |
| 2008/0238240 A1* | 10/2008 | Takahashi et al. ............ 310/201 |
| 2009/0127965 A1* | 5/2009 | Imanishi et al. ............. 310/208 |
| 2009/0200888 A1* | 8/2009 | Tanaka et al. ................ 310/195 |
| 2009/0267441 A1* | 10/2009 | Hiramatsu et al. ........... 310/208 |
| 2010/0141373 A1 | 6/2010 | Murakami |
| 2010/0194214 A1 | 8/2010 | Takahashi et al. |
| 2012/0025658 A1 | 2/2012 | Watanabe et al. |

FOREIGN PATENT DOCUMENTS

| | | |
|---|---|---|
| CN | 101836346 A | 9/2010 |
| JP | 2005-521372 A | 7/2005 |
| JP | 2006-025544 A | 1/2006 |
| JP | 2008-514173 A | 5/2008 |
| JP | 2008-245489 A | 10/2008 |
| JP | 2008-301599 A | 12/2008 |
| JP | 2009-195005 A | 8/2009 |
| WO | 2011/074114 A1 | 6/2011 |

* cited by examiner

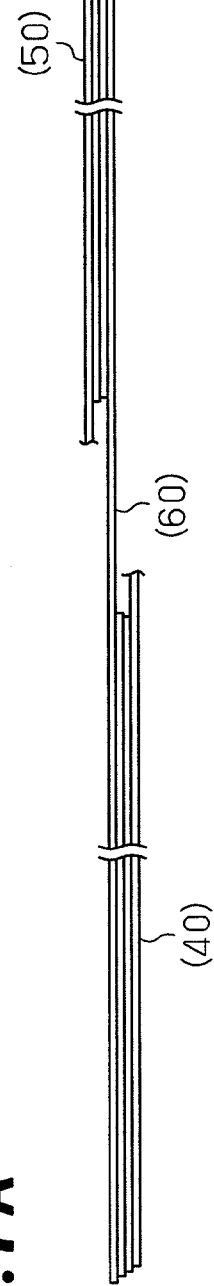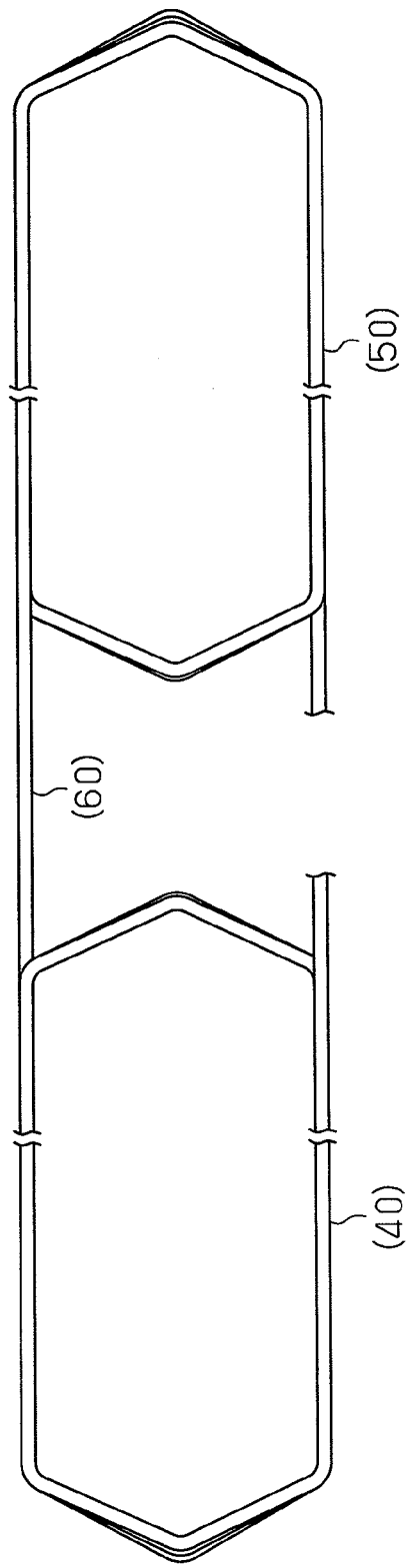

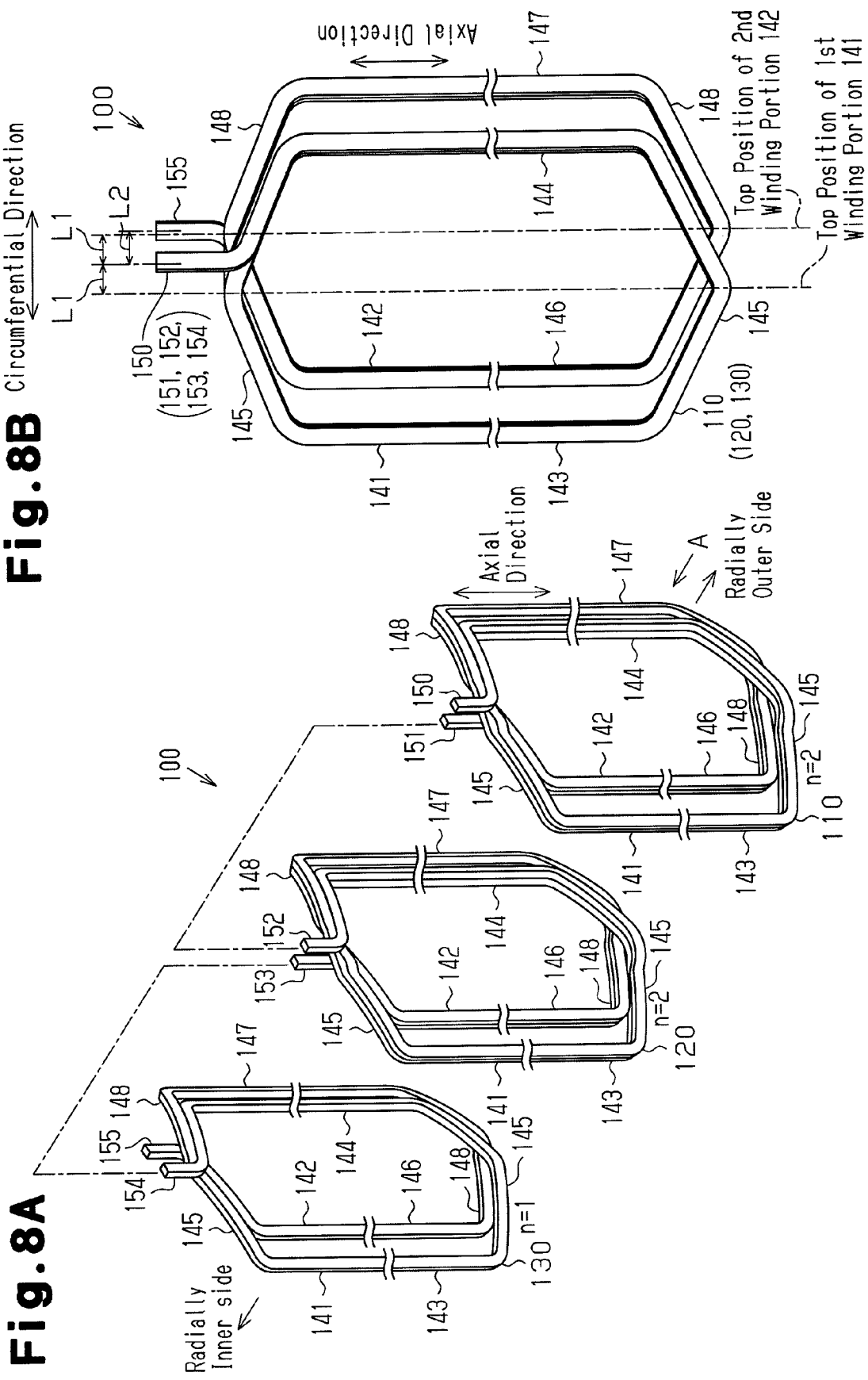

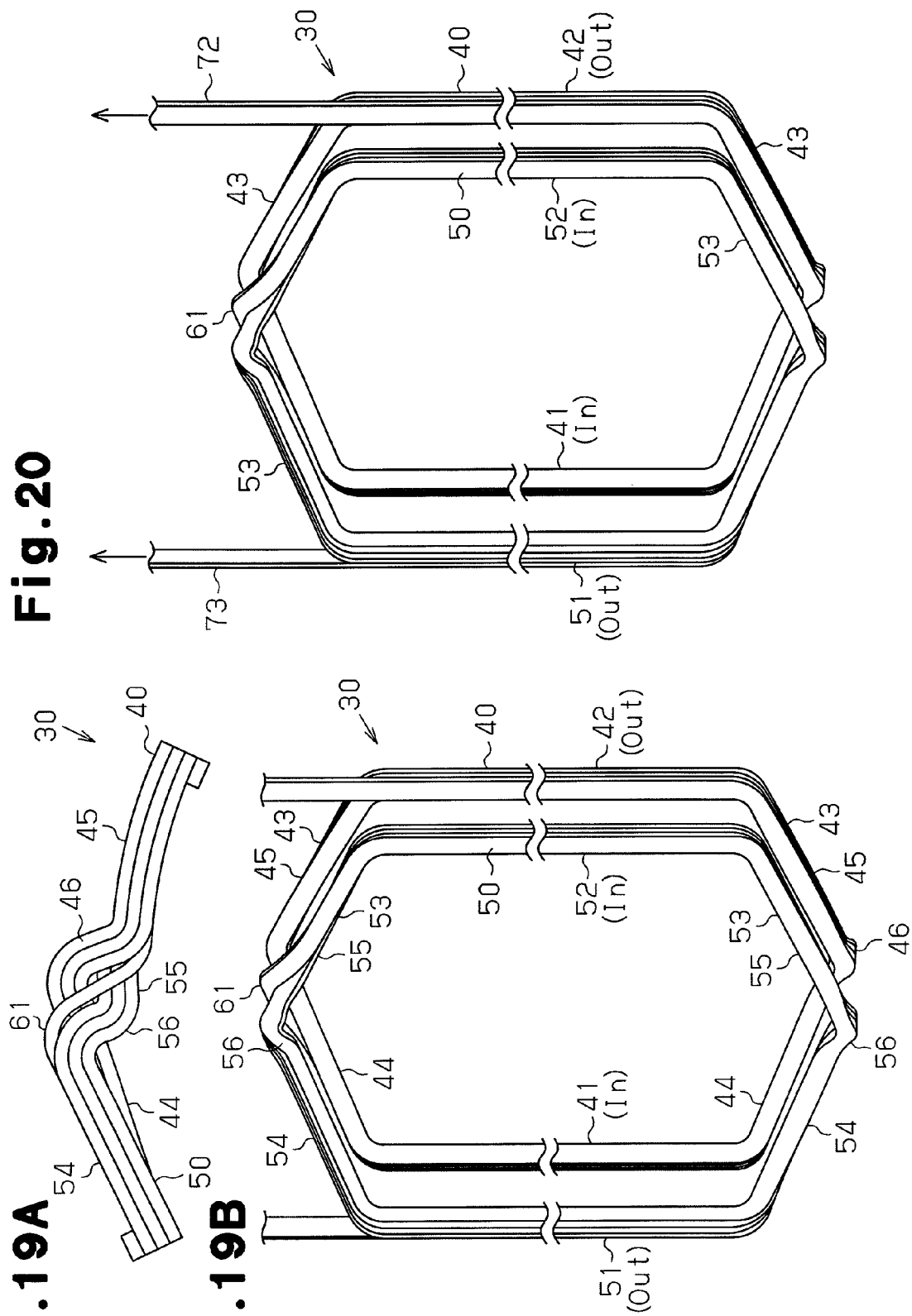

COIL, STATOR, AND METHOD FOR MANUFACTURING COIL

BACKGROUND OF THE INVENTION

The present invention relates to a coil, a stator, and a method for manufacturing a coil.

Japanese Laid-Open Patent Publication No. 2009-195005 describes a rotary electrical machine including two continuous overlapping coils that are obtained by forming two alpha-winding coils and shaping the two alpha-winding coils.

When the alpha-winding coils are expanded, the winding has a tendency of falling apart at portion A as shown in FIG. 23. This increases the length of the coil in the axial direction of a stator.

Also, the coil is obtained by expanding the alpha-winding coils. This forms a turning in portion B in the end of the conductive coil at a crank-shaped portion, as shown in FIG. 24. Thus, the length of the coil is increased in the axial direction of the stator. Here, in a state in which the coil is arranged in a slot of the stator, the turning of the coil occurs when a plane or conductor arranged outward in the radial direction of the stator in one of two slot insertion portions is arranged inward in the radial direction of the stator in the other one of the slot insertion portions. That is, the turning refers to the bending of the coil that switches the position of the plane or conductor in the radial direction.

SUMMARY OF THE INVENTION

It is an object of the present invention to provide a coil, stator, and method for manufacturing a coil that prevents separation of the conductive wire and decreases the axial length.

One aspect of the present invention is a coil arranged in a stator of a rotary electrical machine. The stator includes a plurality of slots arranged in a circumferential direction. The coil includes a first winding portion formed by edgewise-winding a conductive rectangular wire. The first winding portion includes two first slot insertion parts, which are respectively arranged in two first slots spaced apart from each other in the circumferential direction, and two first coil end parts, which connect the two first slot insertion parts. The first slots are included in the plurality of slots of the stator. A second winding portion is formed by edgewise-winding a conductive rectangular wire that is connected to the first winding portion. The second winding portion includes two second slot insertion parts, which are respectively arranged in two second slots spaced apart from each other in the circumferential direction, and two second coil end parts, which connect the two second slot insertion parts. The two second slots are included in the plurality of slots of the stator. Each of the first and second coil end parts includes a crank-shaped section. The first and second winding portions are formed so that when the first and second slot insertion parts are arranged in the corresponding slots. A long side of a cross-section of the rectangular wire extends in the circumferential direction of the stator and a short side of the cross-section of the rectangular wire extends in a radial direction of the stator.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7A is a plan view of a coil subsequent to edgewise winding performed twice with the winding process of FIG. 6;

FIG. 7B is a front view of the coil shown in FIG. 7A;

FIG. 8A is an exploded perspective view of a coil according to a second embodiment of the present invention;

FIG. 8B is a front view of the coil as viewed in the direction of arrow A in FIG. 8A;

FIG. 19A is a plan view of a coil in another example;

FIG. 19B is a front view of the coil shown in FIG. 19A;

FIG. 20 is a front view showing the coil of FIG. 19A to illustrate the positional relationship of drawn out portions;

DETAILED DESCRIPTION OF THE PREFERRED EMBODIMENTS

First Embodiment

A first embodiment of the present invention will now be described with reference to the drawings.

Figure 1:
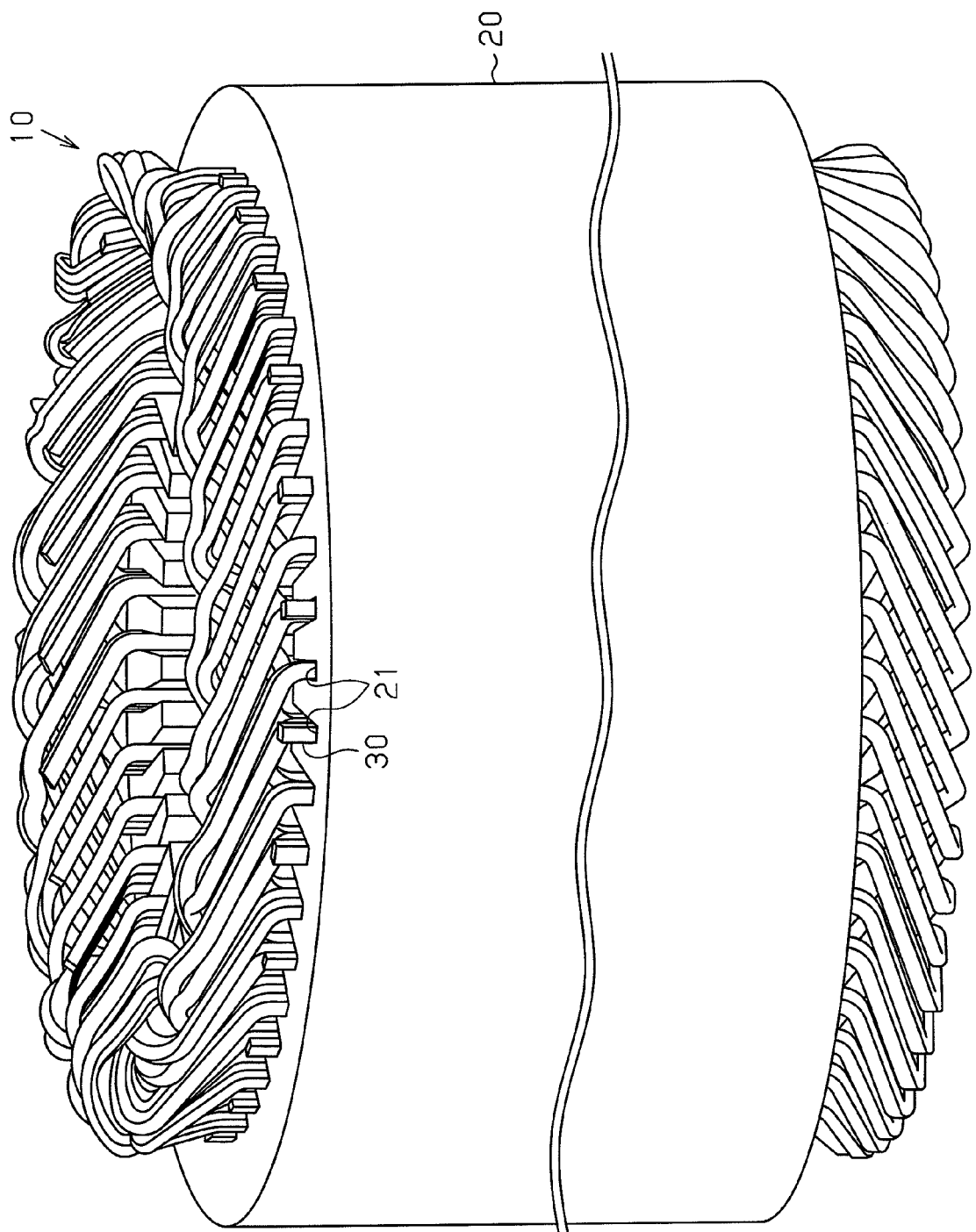
FIG. 1 is a perspective view of a stator assembly according to a first embodiment of the present invention.
Figure 2:
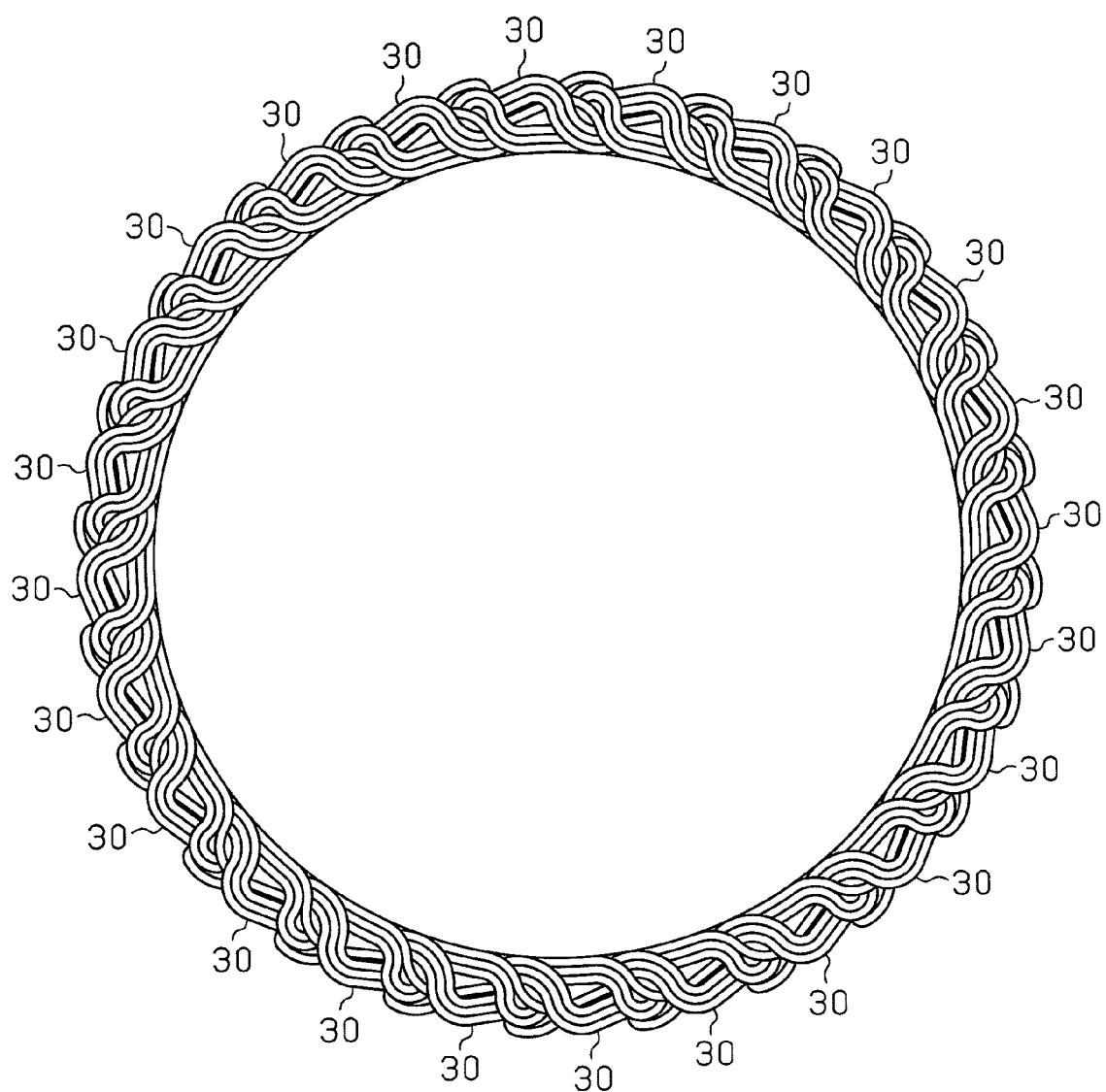
FIG. 2 is a plan view entirely showing a coil (three-phase coil) of FIG. 1.

In the first embodiment, a motor, which functions as a rotary electrical machine, includes a stator 10. As shown in FIG. 1, the stator 10 includes a cylindrical stator core 20. The stator core 20 includes an inner circumferential surface having a large number of slots 21. Each slot 21 opens at the circumferential surface of the stator core 20. A plurality of coils 30 are inserted in the slots 21. The motor of the present embodiment is a three-phase motor. FIG. 2 shows only the coils 30 arranged in the stator. FIG. 2 does not show the drawn out portions of the coils.

Each coil 30 is formed by a single conductive wire. As shown in FIGS. 3 and 4A to 4C, each coil 30 includes two continuous coil portions. More specifically, the coil 30, which is formed by a single conductive wire, includes a first winding portion 40, a second winding portion 50, and further includes a connecting portion 60, which connects the first and second winding portions 40 and 50. A conductive wire is a rectangular wire having a rectangular cross-section. The rectangular wire (conductive wire) undergoes edgewise winding to form the first winding portion 40 and the second winding portion 50.

The first winding portion 40 has a hexagonal shape as viewed in the radial direction of the stator core 20. The first winding portion 40 includes slot insertion parts (first slot insertion parts) 41 and 42 and two coil end parts (first coil end parts) 43. The slot insertion parts 41 and 42 are respectively inserted into two slots 21, which are spaced from each other, in the stator core. The coil end parts 43 protrude from the two axial ends of the stator core 20. Each coil end part 43 includes two oblique sections 44 and 45 and a crank-shaped section 46, which is formed between the oblique sections 44 and 45. The oblique sections 44 and 45 extend obliquely from the ends of the slot insertion parts 41 and 42, respectively. The crank-shaped section 46 connects the oblique sections 44 and 45 to the ends of the slot insertion parts 41 and 42, which are inserted into the two slots 21 (one pair of slots in the group of slots). Each slot 21 receives two slot insertion parts of two adjacent coils 30. In this state, the oblique section 44 and the slot insertion part 41 are located outward in the radial direction (radially outer side). The oblique section 45 and the slot insertion part 42 are located inward in the radial direction (radially inner side). The crank-shaped section 46 connects the radially outer side and the radially inner side.

As described above, the first winding portion 40 is formed by performing edgewise winding on a conductive rectangular wire and includes the two slot insertion parts 41 and 42, which correspond to the stator slots, and the coil end parts 43. Each coil end part 43 of the first winding portion 40 includes the crank-shaped section 46. The rectangular wire forming the slot insertion parts 41 and 42 is wound so that when the slot insertion parts 41 and 42 are inserted into the slots 21, the direction in the long side of the cross-section of the rectangular wire extends in the circumferential direction of the stator and the direction in the short side of the cross-section of the rectangular wire extends in the radial direction of the stator.

The rectangular wire forming the first winding portion 40 is wound so that when the first winding portion 40 is inserted into the slots 21, the rectangular wire arranged at the radially inner side on the slot insertion part 41 (one of two slot insertion parts) is also arranged at the radially inner side on the slot insertion part 42 (the other one of two slot insertion parts) via the coil end part 43.

In the same manner, the second winding portion 50 has a hexagonal shape as viewed in the radial direction of the stator core 20. The second winding portion 50 includes slot insertion parts (second slot insertion parts) 51 and 52 and two coil end parts (second coil end parts) 53. The slot insertion parts 51 and 52 are respectively inserted into two slots 21, which are spaced from each other, in the stator core. The coil end parts 53 protrude from the two axial ends of the stator core 20. Each coil end part 53 includes two oblique sections 54 and 55 and a crank-shaped section 56, which is formed between the oblique sections 54 and 55. The oblique sections 54 and 55 extend obliquely from the ends of the slot insertion parts 51 and 52, respectively. The crank-shaped section 56 connects the oblique sections 54 and 55 to the ends of the slot insertion parts 51 and 52, which are inserted into the two slots 21 (one pair of slots in the group of slots). Each slot 21 receives two slot insertion parts of two adjacent coils 30. In this state, the oblique section 54 and the slot insertion part 51 are located outward in the radial direction (radially outer side). The oblique section 55 and the slot insertion part 52 are located inward in the radial direction (radially inner side). The crank-shaped section 56 connects the radially outer side and the radially inner side.

As described above, the second winding portion 50 is formed by performing edgewise winding on a conductive rectangular wire, which is connected to the first winding portion 40, and includes the two slot insertion parts 51 and 52, which correspond to the stator slots, and the coil end parts 53. Each coil end part 53 of the second winding portion 50 includes the crank-shaped section 56. The rectangular wire forming the slot insertion parts 51 and 52 is wound so that when the slot insertion parts 51 and 52 are inserted into the slots 21, the direction in the long side of the cross-section of the rectangular wire extends in the circumferential direction of the stator and the direction in the short side of the cross-section of the rectangular wire extends in the radial direction of the stator.

The rectangular wire forming the second winding portion 50 is wound so that when the second winding portion 50 is inserted into the slots 21, the rectangular wire arranged at the radially inner side on the slot insertion part 51 (one of two slot insertion parts) is also arranged at the radially inner side on the slot insertion part 52 (the other one of two slot insertion parts) via the coil end part 53.

In the circumferential direction of the stator core 20, the slot insertion parts 41, 42, 51, and 52 are arranged so that the slot insertion part 41 of the first winding portion 40 is located outward (leftward in FIG. 4C) from the slot insertion part 51 of the second winding portion 50, and the slot insertion part 42 is located inward (leftward in FIG. 4C) from the slot insertion part 52 of the second winding portion 50. Further, the slot insertion part 52 of the second winding portion 50 is located outward (rightward in FIG. 4C) from the slot insertion part 42 of the first winding portion 40, and the slot insertion part 51 is located inward (rightward in FIG. 4C) from the slot insertion part 41 of the first winding portion 40.

Figure 5:
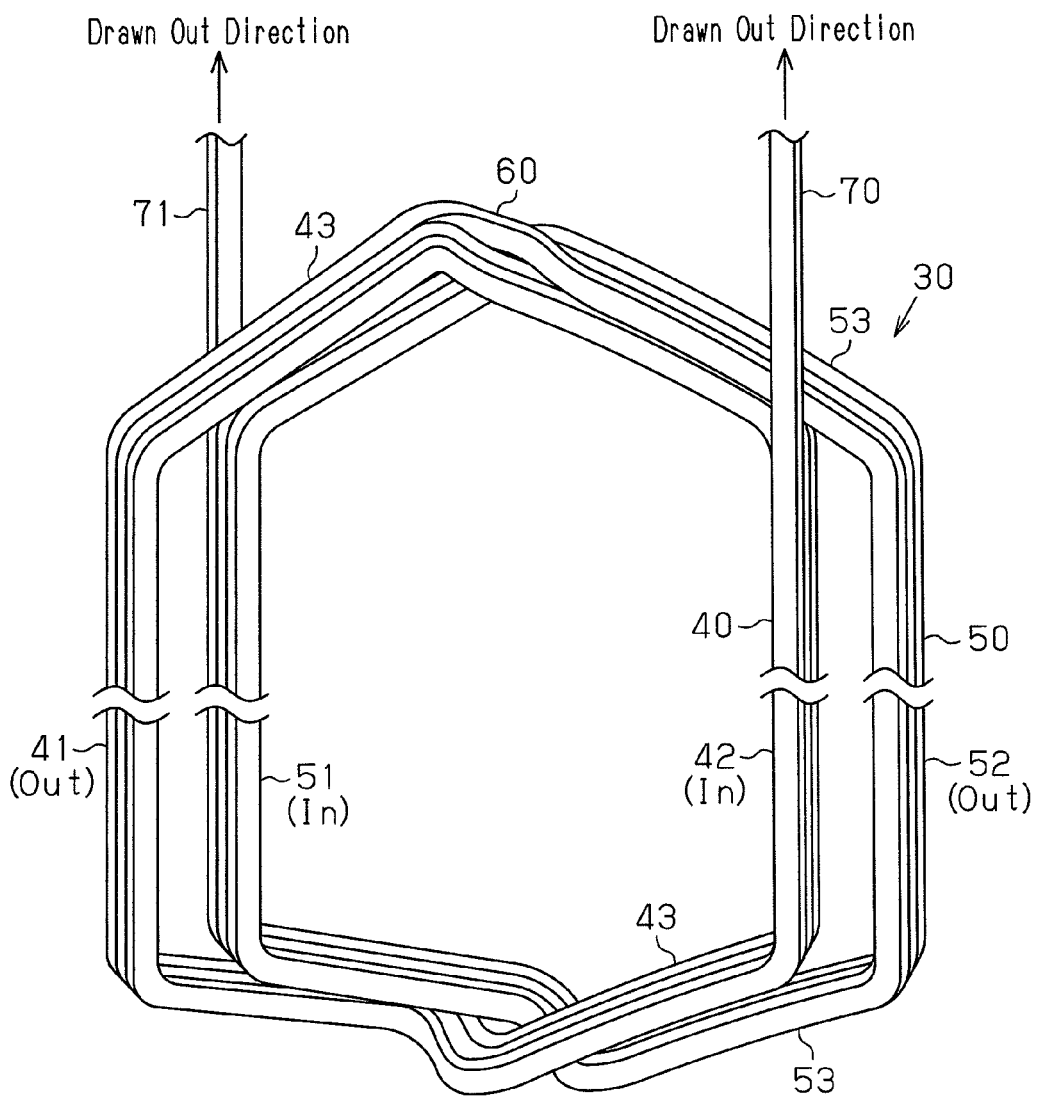
FIG. 5 is a front view showing the coil of FIG. 3 to illustrate the positional relationship of drawn out portions.

As shown in FIG. 5, each coil 30 includes a first drawn out portion 70 and a second drawn out portion 71. The first drawn out portion 70 is drawn out from the slot insertion part 42. The second drawn out portion 71 is drawn out from the slot insertion part 51.

Figure 4A:
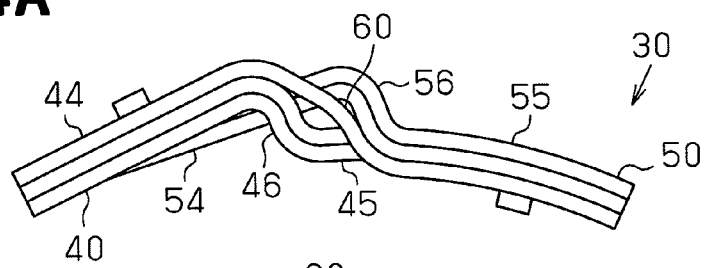
FIG. 4A is a plan view showing the coil of FIG. 3.
Figure 4B:
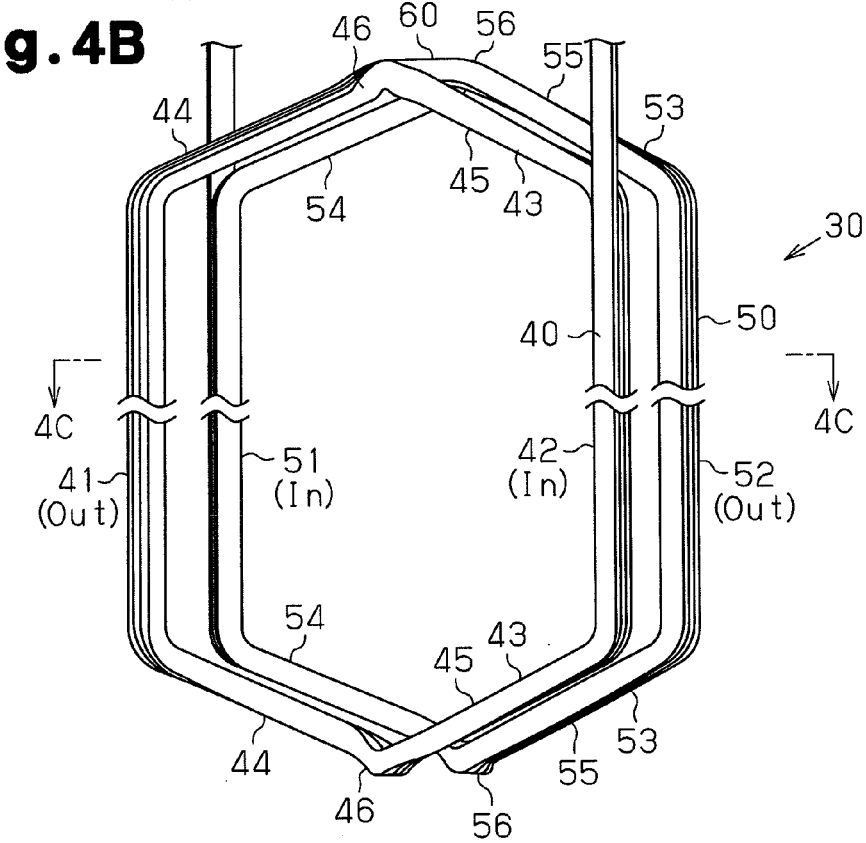
FIG. 4B is a front view of the coil shown in FIG. 3.

As shown in FIG. 4B, the connecting portion 60 connects the slot insertion part 41 and the slot insertion part 52. The connecting portion 60 extends through a valley formed between the crank-shaped section 46 and the crank-shaped section 56.

As shown in FIG. 1, the coils 30 are inserted in the slots 21 of the stator core to form the stator assembly. The coils 30 inserted in the slots 21 form the entire three-phase coil as shown in FIG. 2.

In the stator assembly shown in FIG. 1, a connecting wire connecting the coils 30 of the same phase to each other are not shown. FIG. 2 also does not show the connecting wire connecting the coils 30 of the same phase to each other.

The stator 10 includes eight coils 30 for each phase. Thus, for the three phases (U-phase, V-phase, and W-phase), the stator 10 includes a total of twenty-four (8×3) coils 30. The coils 30 of the three different phases are inserted into the slots in order so that two slot insertion parts of the same phase (same pole) are arranged next to each other. Thus, the number of slots having the same polarity is two in the first embodiment.

A method for manufacturing the coil 30 of the present embodiment including the two winding portions 40 and 50 will now be described.

Figure 6:
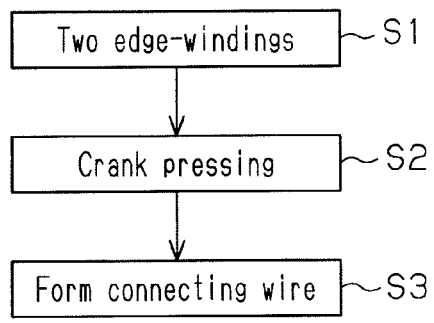
FIG. 6 is a flowcharting showing a coil manufacturing process.

FIG. 6 shows a process for manufacturing the coil 30.

In a first step S1 in FIG. 6, the edgewise winding is performed twice. More specifically, a single conductive rectangular wire is wound edgewise from its end to sequentially form the substantially hexagonal first winding portion 40 and the substantially hexagonal second winding portion 50, which are connected by the connecting portion 60. This winds the single conductive wire as shown in the states of FIGS. 7A and 7B.

In a second step S2, crank pressing is performed. More specifically, the crank-shaped sections 46 and 56 are formed in the coil end parts 43 and 53 of the first winding portion 40 and the second winding portion 50. The coil end parts 43 are pressed in the vertical direction as viewed in FIG. 7A, that is, in the direction perpendicular to the surface extending in the long side of the cross-section of the rectangular wire.

In a third step S3, the connecting portion is formed. Parts of the connecting portion 60 corresponding to the crank-shaped sections 46 and 56 are pressed into cranked shapes. The connecting portion 60 is pressed in substantially the same direction as the pressing performed in the second step S2. The pressing may be performed simultaneously with the second step S2. Subsequently, the two slot insertion parts 41 and 42 are aligned with two of the slots, and the two slot insertion parts 51 and 52 are aligned with two of the slots. Parts of the connecting portion 60 corresponding to the oblique sections 44 and 55 are bent to form the oblique sections 44 and 55.

Figure 4C:
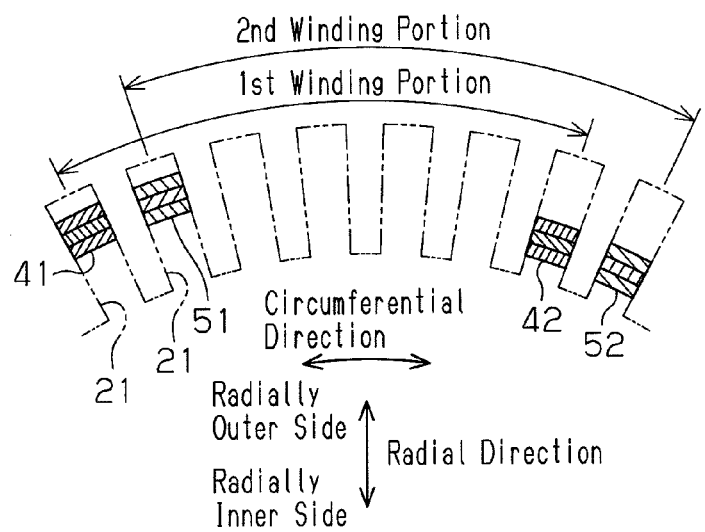
FIG. 4C is a cross-sectional view taken along line 4C-4C in FIG. 4B.

This process forms the coil 30 shown in FIGS. 4A to 4C, that is, the coil 30 that connects the first winding portion 40 and the second winding portion 50 with the connecting portion 60.

Eight coils 30 are provided for each phase. Each coil 30 includes two coil portions. A total of twenty-four coils 30 are then inserted into the slots 21 as shown in FIG. 2. This completes the stator 10 shown in FIG. 1.

The manufacturing process described above is one example. The coil 30 may be manufactured through other processes.

The operation of the coil 30 will now be described.

Figure 3:
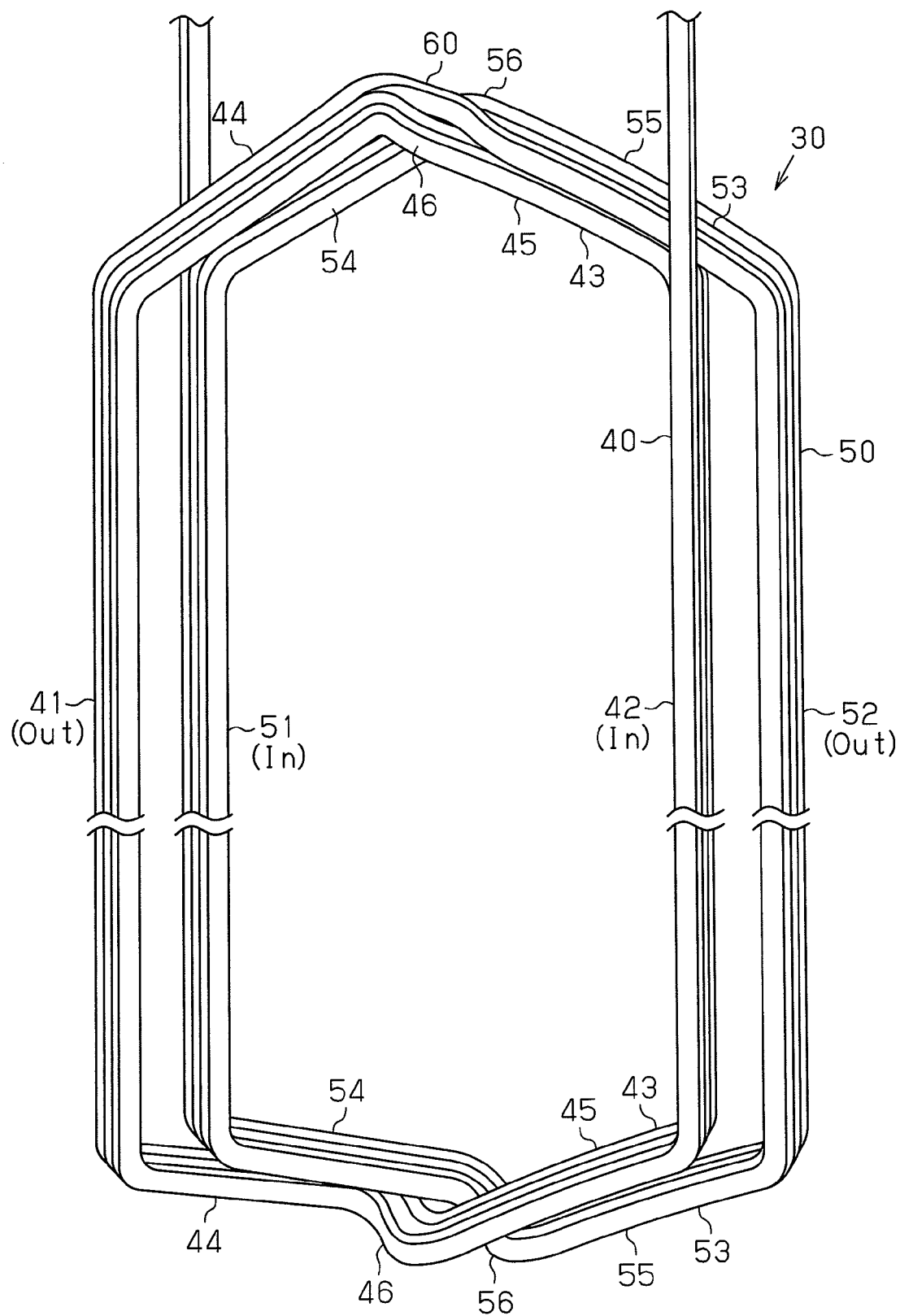
FIG. 3 is a perspective view showing the coil of FIG. 1.

As shown in FIGS. 3 to 4C, the coils 30 of the present embodiment each includes the two winding portions 40 and 50, each of which is edgewise wound into a hexagonal shape. The two winding portions 40 and 50 are stacked together. Thus, when the coils 30 are inserted into the slots 21, windings do not fall apart when expanding the space between the slot insertion parts 41 and 42 and the space between the slot insertion parts 51 and 52. Further, the coil 30 has a small length in the axial direction of the stator.

In the coil 30 of the present embodiment, the winding portions 40 and 50 are edgewise wound and are connected to each other. In this case, the crank-shaped sections 46 and 56 have no turnings, and the coil does not extend beyond the crank-shaped sections 46 and 56. Thus, the length of the coils in the axial direction of the stator is small.

Further, in the coil 30 of the present embodiment, the connecting portion 60 connecting the two winding portions 40 and 50 extends through the valley between the crank-shaped sections 46 and 56 (ridges). Thus, the conductive wire does not extend beyond the crank-shaped sections 46 and 56. The coils 30 do not include parts protruding in the axial or includes parts protruding in the axial direction over a short distance. This decreases the axial length by an amount corresponding to the connecting portion.

The present embodiment has the advantages described below.

(1) The coil 30, which includes two coil portions, is formed by winding, in an overlapped manner, the conductive rectangular wire into the first winding portion 40 and the second winding portion 50. The coil end parts 43 and 53 of the first winding portion 40 and the second winding portion 50 include the crank-shaped sections 46 and 56 formed by edgewise-winding the rectangular wire. Also, the first and second winding portions 40 and 50 are formed so that the direction in the long side of the cross-section of the rectangular wire extends in the circumferential direction of the stator and the direction in the short side of the cross-section of the rectangular wire extends in the radial direction of the stator when the slot insertion parts 41, 42, 51, and 52 are inserted into the slots 21.

Figure 23:
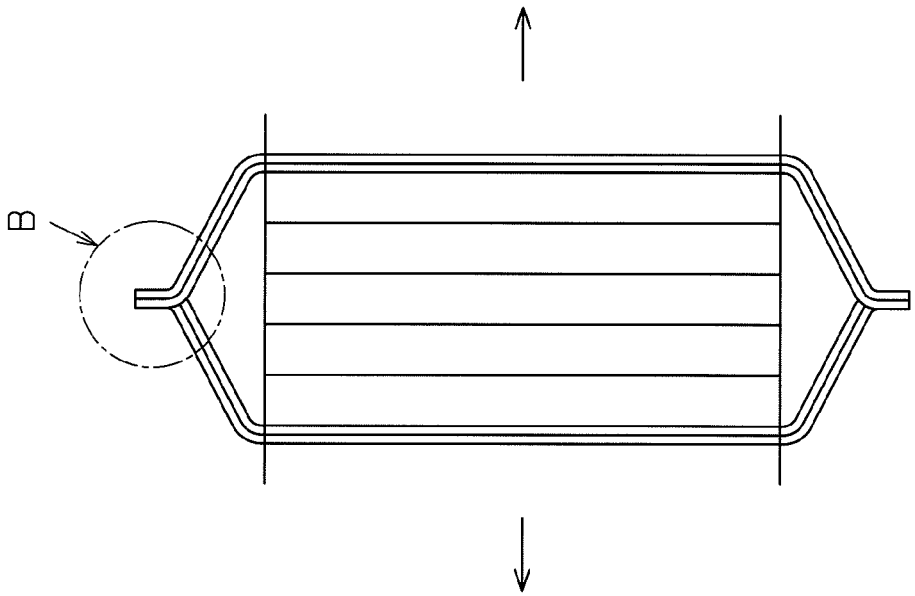
FIG. 23 is a perspective view showing a prior art coil.
Figure 24:
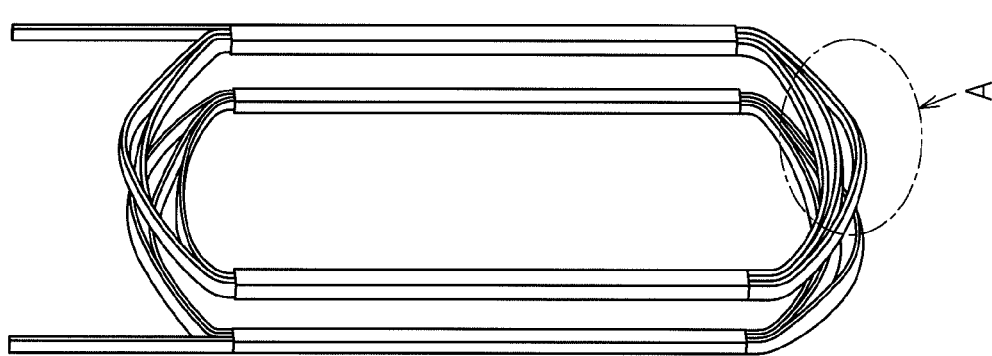
FIG. 24 is a front view of the coil shown in FIG. 23.

The turnings of the alpha-winding coils shown in FIG. 23 easily fall apart when expanding the coils. This increases the length of the coil in the axial direction of the stator. In contrast, the coil of the present embodiment is formed by edgewise-winding a rectangular wire. Thus, turnings of the wire do not fall apart after the two winding portions are formed, and the length of the coil is prevented from increasing in the axial direction of the stator. Further, the coil shown in FIG. 24 is formed by the expanded alpha-winding coils. Thus, the turnings in portion B, which is the crank-shaped section, increase the length of the coil in the axial direction of the stator. In contrast, the crank-shaped sections 46 and 56 in the coil end parts 43 and 53 of the present embodiment have no turnings. This prevents the length of the coil from increasing in the axial direction of the stator.

This structure prevents the turnings of wire in the coil end parts 43 and 53 from falling apart. Further, turnings are eliminated from the conductive wire in the crank-shaped sections of the coil end parts. This reduces the length of the coil in the axial direction of the stator 10.

(2) The coil 30 includes the connecting portion 60 connecting the first winding portion 40 and the second winding portion 50. The connecting portion 60 extends between the crank-shaped section 46 of the first winding portion 40 and the crank-shaped section 56 of the second winding portion 50. This structure decreases the length of the coil in the axial direction of the stator 10.

(3) The coil 30 includes the connecting portion 60 connecting the first winding portion 40 and the second winding portion 50. One of the two slot insertion parts 41 and 42 is arranged outward from the second winding portion 50 in the coil 30. The other one of the slot insertion parts 41 and 42 is arranged outward from the first winding portion 40 in the coil 30. The connecting portion 60 connects the slot insertion parts 41 and 52 that are arranged at the outer side. This facilitates the formation of the connecting portion.

(4) When manufacturing the coil, a single conductive rectangular wire is edgewise-wound to form the first winding portion 40 and the second winding portion 50, which are connected by the connecting portion 60 (first step). The crank-shaped sections 46 and 56 are formed in the coil end parts 43 and 53 of the first winding portion 40 and the second winding portion 50 (second step). The connecting portion 60 is formed so that the two slot insertion parts 41 and 42 in the first winding portion 40 and the two slot insertion parts 51 and 52 in the second winding portion 50 are aligned with corresponding pairs of slots arranged in the stator core 20 in the circumferential direction (third step). This completes the coil 30 having advantage (1), which is described above.

(5) Edgewise winding is performed to form the winding portions 40 and 50. The rectangular wire can be wound from one of its end to sequentially form the first winding portion 40 and the second winding portion 50. Accordingly, the coil 30 is easily manufactured. When forming the coil including two coil portions as shown in FIG. 23, a rectangular wire having a predetermined length needs to be prepared and be wound from its central portion.

(6) The winding portions 40 and 50 are formed by performing edgewise winding. In this case, the crank-shaped sections have no turnings. The crank-shaped sections and parts of the connecting portion corresponding to the crank-shaped sections can be formed by bending the surface of the rectangular wire corresponding to the direction of the long side of the cross-section of the rectangular wire. Thus, the crank-shaped sections and the parts of the connecting portion corresponding to the crank-shaped sections can be formed easily.

Second Embodiment

A second embodiment of the present invention will now be described focusing on differences from the first embodiment. The terms "winding-initiation drawn out portion" and "winding-termination drawn out portion" are used in the present embodiment for the sake of convenience. These terms do not limit the process for winding a coil.

As shown in FIGS. 8A and 8B, in the present embodiment, a coil 100 includes a plurality of (three in FIG. 8A) coil elements arranged in a plurality of layers. Specifically, the coil 100 includes a first coil element 110 in a first layer, a second coil element 120 in a second layer, and a third coil element 130 in a third layer. The coil element 110 (outermost coil element) in the first layer is located outermost in the radial direction. The coil element 120 (intermediate coil element) in the second structure is located inward in the radial direction from the coil element 110 of the first layer. The third coil element 130 (innermost coil element) is located innermost in the radial direction.

Each of the coil elements 110, 120, and 130 includes a first winding portion 141 and a second winding portion 142. The first winding portion 141 is formed by edgewise-winding a conductive rectangular wire and includes two slot insertion parts 143 and 144, which correspond to slots 21 of a stator, and two coil end parts 145. The second winding portion 142 is formed by edgewise-winding a conductive rectangular wire, which is connected to the first winding portion 141, and includes two slot insertion parts 146 and 147, which correspond to slots 21 of the stator, and two coil end parts 148.

The first winding portion 141 and the second winding portion 142 in each of the separate coil elements (i.e., the coil elements 110, 120, and 130) are arranged in the slots 21. Each of the coil elements 110, 120, and 130 is formed to that each coil element has at least one winding arranged in the same slot. Also, the coil 100 has an overlapped winding (spiral winding) structure of a plurality of layers (i.e., the three coil elements 110, 120, and 130). The slot insertion parts 143 of the plurality of layers are inserted into the same slot, the slot insertion parts 144 of the plurality of layers are inserted into the same slot, the slot insertion parts 146 of the plurality of layers are inserted into the same slot, and the slot insertion parts 147 of the plurality of layers are inserted into the same slot. In other words, the coil 100 including the plurality of layers (three layers) separated in the radial direction includes two coil portions. The plurality of coil elements 110, 120, and 130 are arranged in the radial direction of the stator.

The coil 100 of the present embodiment is also wound in an overlapped manner with the number of slots having the same polarity being two. As shown in FIG. 4C, the slot insertion part 41 (the slot insertion part 143 of each layer in FIGS. 8A and 8B) and the slot insertion part 51 (the slot insertion part 146 of each layer in FIGS. 8A and 8B) have the same polarity. Further, the slot insertion part 41 and the slot insertion part 51 are inserted in adjacent slots. The slot insertion part 42 (the slot insertion parts 144 of the plurality of layers in FIGS. 8A and 8B) and the slot insertion part 52 (the slot insertion parts 147 of the plurality of layers in FIGS. 8A and 8B) have the same polarity. The slot insertion part 42 and the slot insertion part 52 are inserted in adjacent slots. In the coil 100, the winding portions (the winding portions 141 and 142 in FIGS. 8A and 8B) inserted in two slots having the same polarity are connected.

As shown in FIGS. 8A and 8B, the first coil element 110 includes a winding-initiation drawn out portion 150 of the first winding portion 141 and a winding-termination drawn out portion 151 of the second winding portion 142. The second coil element 120 includes a winding-initiation drawn out portion 152 of the first winding portion 141 and a winding-termination drawn out portion 153 of the second winding portion 142. The third coil element 130 includes a winding-initiation drawn out portion 154 of the first winding portion 141 and a winding-termination drawn out portion 155 of the second winding portion 142. The drawn out portions 151, 153, and 155 function as inner drawn out portions that are arranged at the inner side in the radial direction of the stator. The drawn out portions 150, 152, and 154 function as outer drawn out portions that are arranged at the outer side in the radial direction of the stator. The drawn out portions 150, 151, 152, 153, 154, and 155 extend in the axial direction and drawn out from the winding portions.

In the coil 100, the drawn out portions 151, 152, 153, and 154 in adjacent ones of the coil elements 110, 120, and 130 are located at the same position in the circumferential direction. In other words, the drawn out portions in adjacent coil elements are arranged at overlapping positions. The ends of the drawn out portions 151, 152, 153, and 154 in the coil elements 110, 120, and 130 are directly joined with each other.

More specifically, the winding-termination drawn out portion 151 of the first coil element 110 and the winding-initiation drawn out portion 152 of the second coil element 120 are located at the same phase position in the circumferential direction. The winding-termination drawn out portion 153 of the second coil element 120 and the winding-initiation drawn out portion 154 of the third coil element 130 are located at the same phase position in the circumferential direction. In other words, the winding-termination drawn out portion of one coil element is located at the same phase position in the circumferential direction as the winding-initiation drawn out portion of the next inner coil element.

Thus, as shown in FIG. 8B, the end of the first winding portion 141 from which the winding is initiated extends in the axial direction at a position offset from the top position of the coil end part 145 in a direction that shortens the oblique section of a winding-initiation portion before the top of the coil end part 145. The end of the second winding portion 142 at which the winding is terminated extends in the axial direction at a position that is offset from the top position of the coil end part 148 in a direction that shortens the oblique section of a winding-termination portion before the top of the coil end part 148. The ends of the first and second winding portions 141 and 142 are then joined with each other. In other words, the winding-initiation drawn out portions 150, 152, and 154 of the coil elements 110, 120, and 130 are drawn out in the axial direction at positions that are offset by a distance L1 from the top position of the coil end part 145 in a direction that shortens the oblique section of a winding-initiation portion of the coil end part 145. The winding-termination drawn out portions 151 and 153 of the coil elements 110 and 120 are drawn out in the axial direction at positions that are offset by the distance L1 from the top position of the coil end part 148 in a direction that shortens the oblique section of a winding-termination portion of the coil end part 148. The drawn out portions are then joined with each other.

The drawn out portions 150, 151, 152, 153, and 154 extend in the axial direction at a middle position in the circumferential direction between the top of the first winding portion 141 (the coil end part 145) and the top of the second winding portion 142 (the coil end part 148).

The coil of the present embodiment obtains a coil end height that is that is the same as the coil end of the hairpin coil described in Japanese Laid-Open Patent Publication No. 2009-195005, in which the coil is separated for each winding, but with less separate portions in the copper wire. The coil of the present embodiment thus requires less cost for coil formation, end processing, and welding.

In detail, the coil described in Japanese Laid-Open Patent Publication No. 2009-195005 has a crank-shaped section including a large number of turnings of copper wire. Thus, when preventing adjacent turnings from interfering with each other, the coil end height would become large. If the wire is continuously wound between the poles, the coil would have a poor setting capability. In contrast, the coil of the present embodiment reduces the coil end height and has good setting capability.

Figure 9:
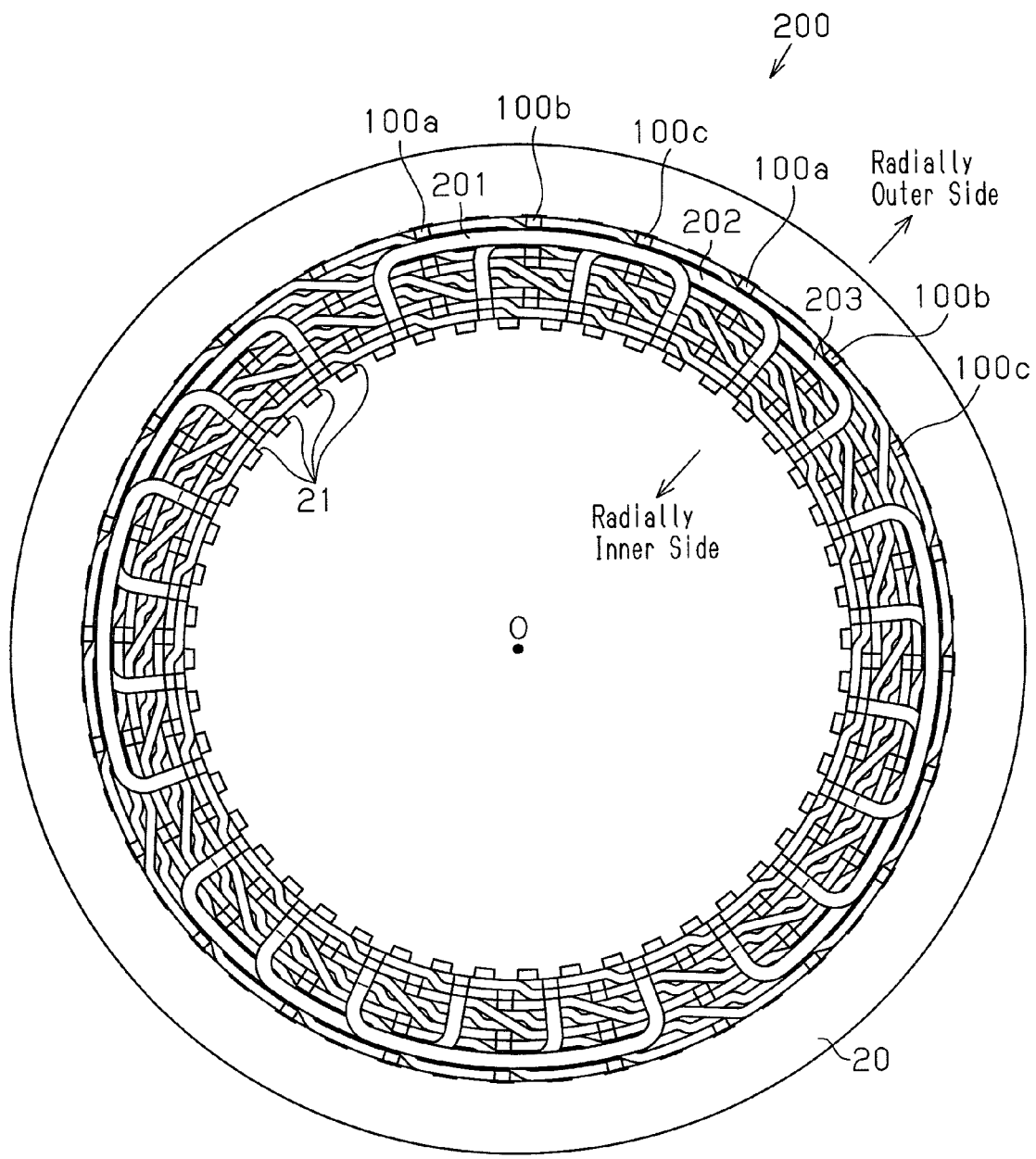
FIG. 9 is a plan view showing a stator including the coil of FIG. 8A.
Figure 10:
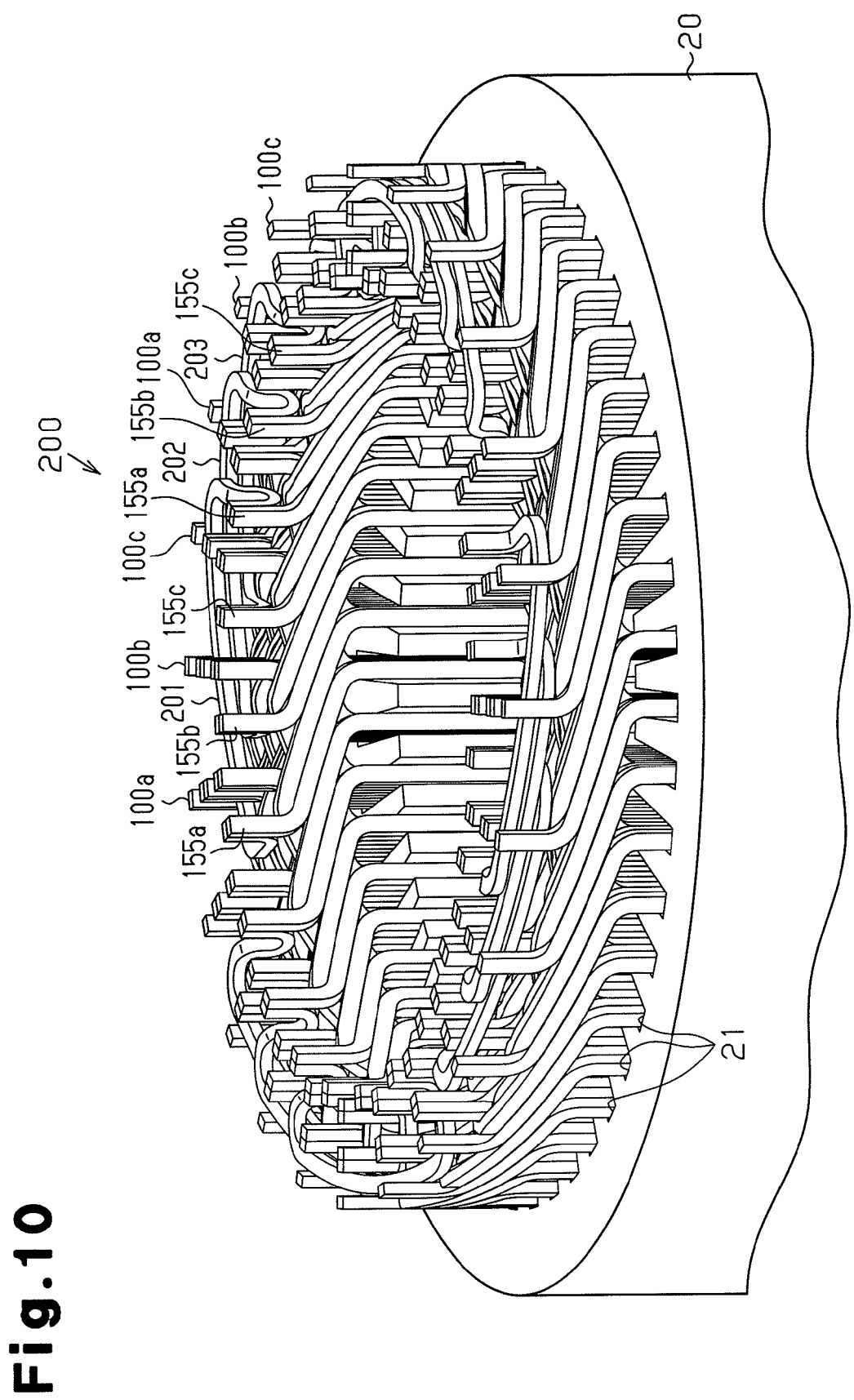
FIG. 10 is a perspective view of the stator shown in FIG. 9.

As shown in FIGS. 9 and 10, a U-phase coil 100a, a V-phase coil 100b, and a W-phase coil 100c are inserted in the slots 21 of the stator core 20. The structures of the coils 100a, 100b, and 100c will now be described with reference to FIGS. 8A and 8B.

Figure 11:
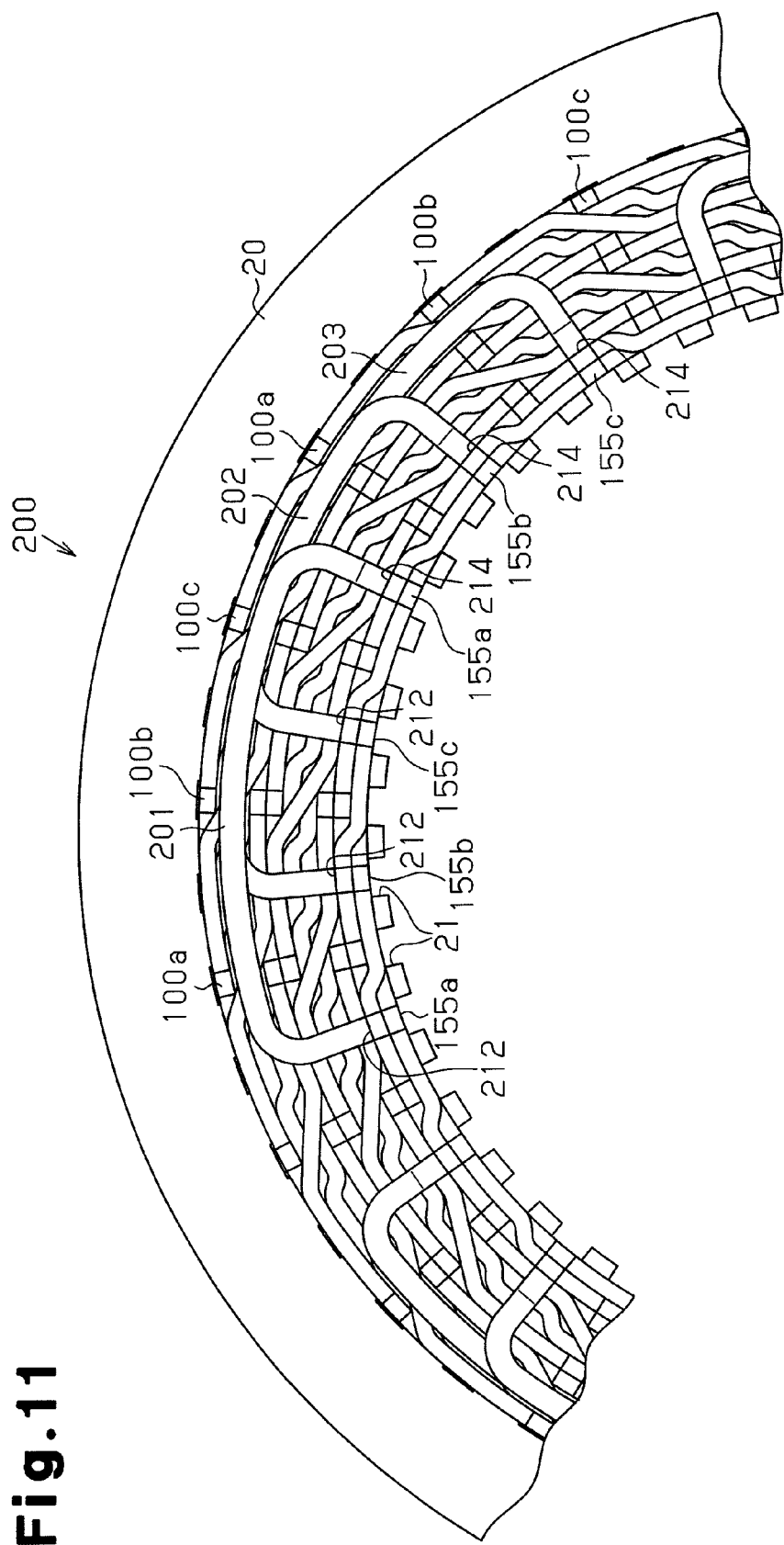
FIG. 11 is a partial plan view showing the stator of FIG. 9.
Figure 12:
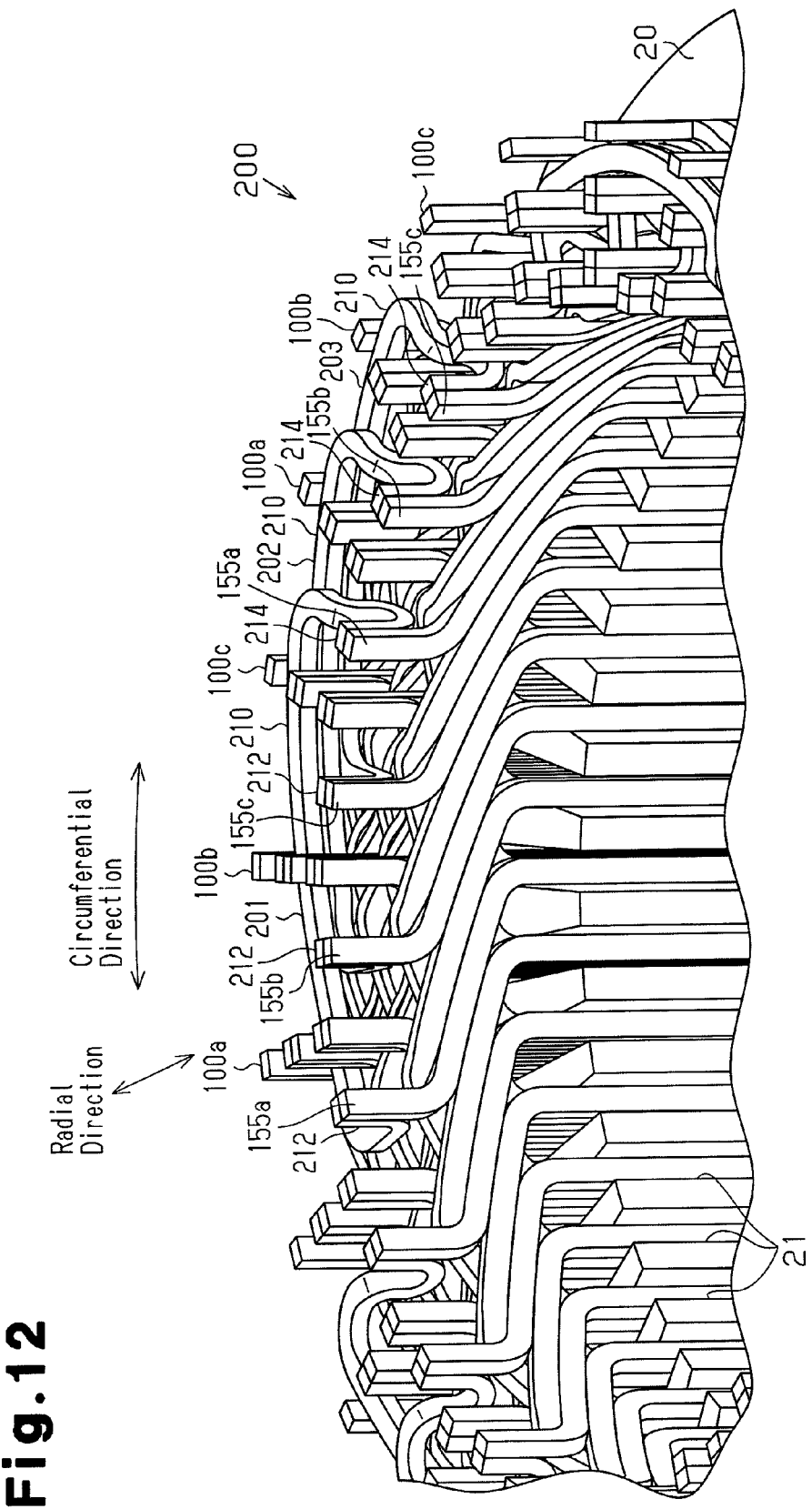
FIG. 12 is a partial perspective view showing the stator of FIG. 9.
Figure 13:
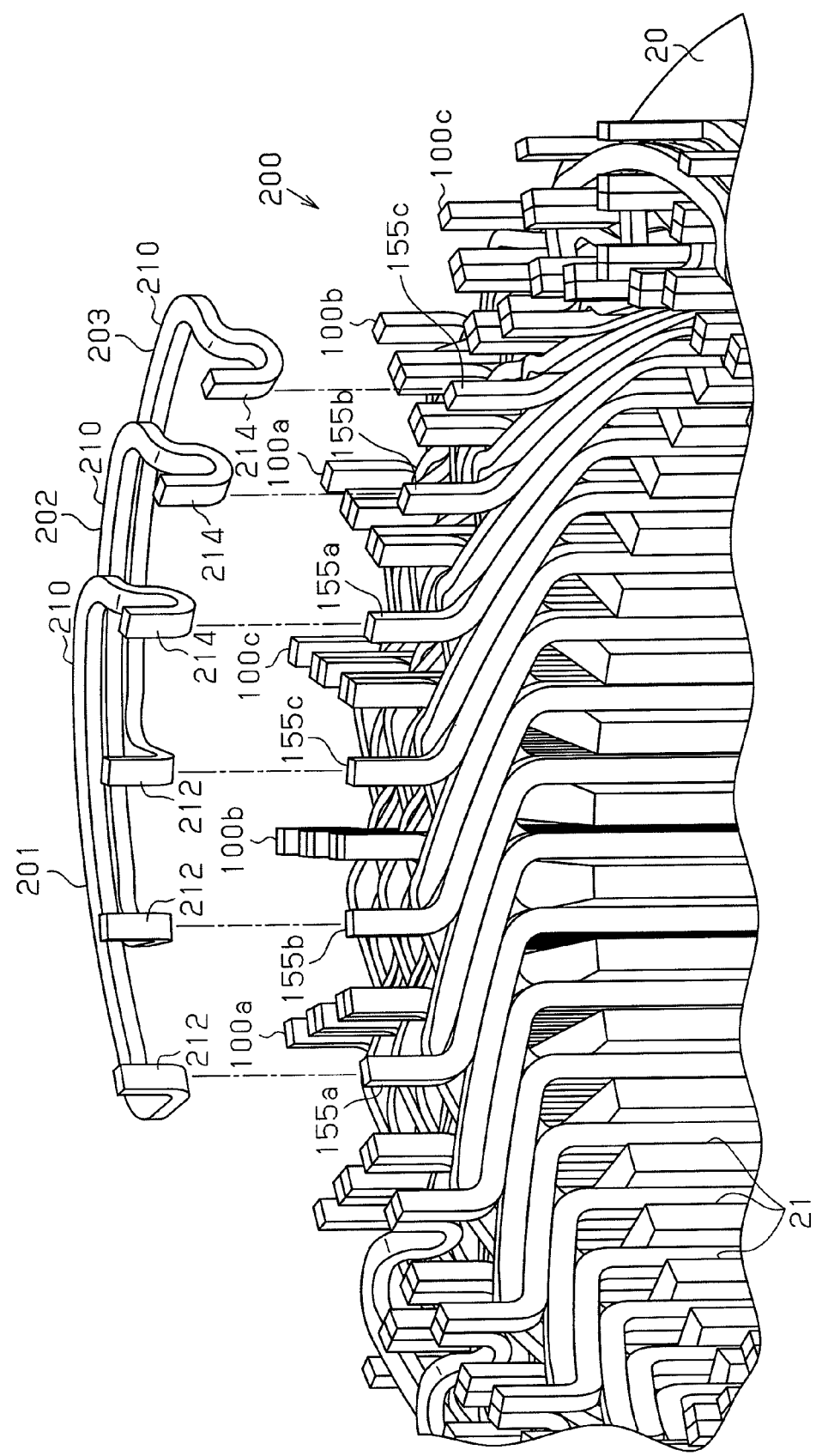
FIG. 13 is a partially exploded perspective view showing the stator of FIG. 9.
Figure 14:
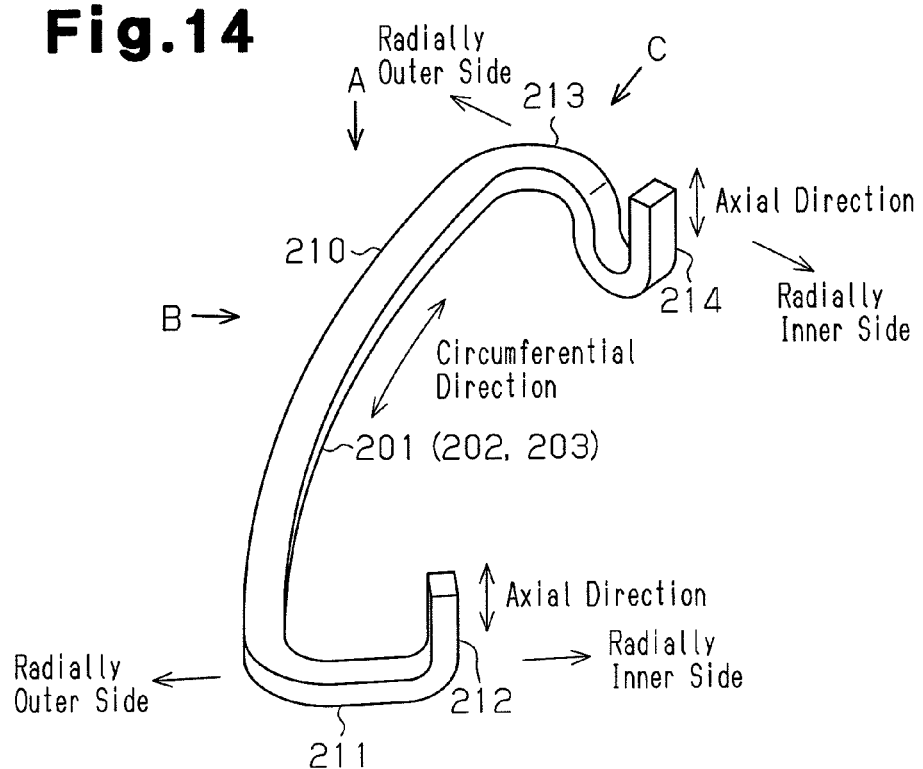
FIG. 14 is a perspective view of a connecting wire for connecting coils of the same phase shown in FIG. 13.

The coils 100 of the same phase are connected by a connecting wire. More specifically, the drawn out portions 155 of the coils 100 that are of the same phase and adjacent in the circumferential direction of the stator (refer to FIGS. 8A and 8B) are connected by connecting wires 201, 202, and 203 of the same phase. In detail, as shown in FIGS. 11 to 13, the connecting wires 201, 202, and 203 are respectively located outward in the radial direction from innermost drawn out portions 155a, 155b, and 155c. Thus, none of the connecting wires 201, 202, and 203 of the same phase are arranged inward in the radial direction from the inner circumferential surface of the stator 200 (the stator core 20). Further, none of the connecting wires 201, 202, and 203 of the same phase protrude from the inner circumferential surface of the stator. The connecting wires 201, 202, and 203 of the same phase (upright parts 212 and U-shaped parts 214) are aligned and bonded on a surface of the stator other than the inner circumferential surface, that is, on an axial end surface of the stator core 20.

The adjacent coils 100 of the same phase are also connected by a connecting wire at the outermost drawn out portions 150 in the radial direction, although this connection is not shown in the drawings.

As shown in FIGS. 8A and 8B, in the coil 100, the innermost drawn out portion 155 in the radial direction is offset in the circumferential direction by distance L2 from the drawn out portions 150 to 154, which are arranged outward in the radial direction from the drawn out portion 155. More specifically, in the coil 100, the drawn out portion 155 of the innermost coil element 130 in the radial direction is drawn out in the axial direction from a position offset from the drawn out portions 150, 151, 152, 153, and 154 of the coil elements 120 and 110 outward in the radial direction by an amount corresponding to a one-slot pitch (distance L2) in the circumferential direction. The drawn out portion 155 functions as an offset drawn out portion.

More specifically, the drawn out portions 150 to 154 of the adjacent coils 100 are spaced apart from each other by a two-slot pitch in the circumferential direction. Thus, the drawn out portion 155 is formed at a middle position between the drawn out portions 150 to 154 that are adjacent in the circumferential direction. That is, the drawn out portion 155 is formed at a position offset from adjacent drawn out portions 150 to 154 by the one-slot pitch.

As shown in FIG. 12, each of the connecting wires 201, 202, and 203 of the same phase extends in the radial direction and the circumferential direction in a space in which none of the drawn out portions 150 to 155 are arranged. Each of the connecting wires 201, 202, and 203 connects the drawn out portions 155 of the coil elements located inward in the radial direction.

As shown in FIG. 13, the innermost coil element 130 of each of the U-phase, V-phase, and W-phase coils 100a, 100b, and 100c includes the corresponding one of the drawn out portions 155a, 155b, and 155c. The drawn out portions 155a, 155b, and 155c of the same phase that are adjacent to each other are connected to each other by the connecting wires 201, 202, and 203 of the U-phase, V-phase, and W-phase.

Each of the connecting wires 201, 202, and 203 of the same phase is formed by a single rectangular wire. As shown in FIGS. 14 to 17, each of the connecting wires 201, 202, and 203 includes an oblique section 210, which extends in the circumferential direction, a radial extension part 211, an upright part 212, a radial extension part 213, and a U-shaped part 214. The oblique section 210 extends through an area formed between the drawn out portions 150 and 151 shown in FIG. 8A. The area between the drawn out portions 150 and 151 in the radial direction is narrow such that only allow a single rectangular wire can pass therethrough.

Figure 15:
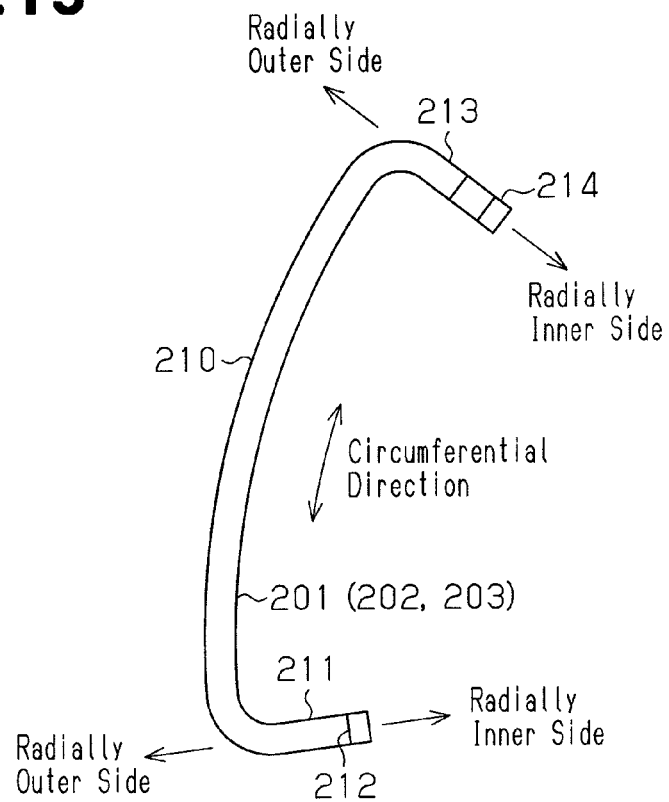
FIG. 15 is a view showing the connecting wire for connecting the coils of the same phase as viewed in the direction of arrow A in FIG. 14.
Figure 16:
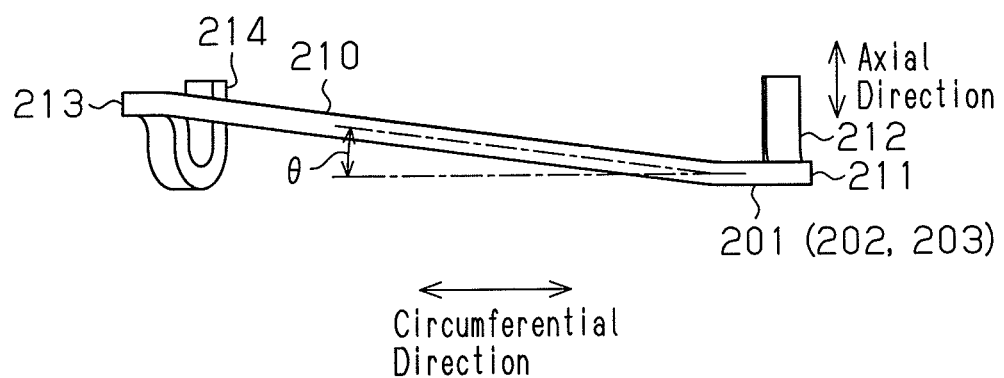
FIG. 16 is a view showing the connecting wire for connecting the coils of the same phase as viewed in the direction of arrow B in FIG. 14.
Figure 17:
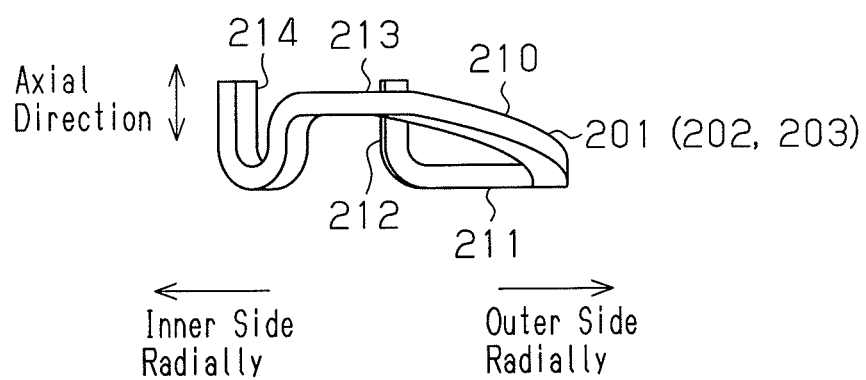
FIG. 17 is a view showing the connecting wire for connecting the coils of the same phase as viewed in the direction of arrow C in FIG. 14.

As shown in FIG. 16, the oblique section 210 extends in a state inclined by angle θ relative to the circumferential direction. As shown in FIGS. 15 and 17, the radial extension part 211 extends inward in the radial direction from one end of the oblique section 210. The upright part 212 extends in the axial direction from the distal end of the radial extension part 211. The distal end of the upright part 212 functions as one of two connection parts that are connected to the drawn out portion 155 of the coil element 130. As shown in FIGS. 15 and 17, the radial extension part 213 extends inward in the radial direction from the other end of the oblique section 210. The U-shaped part 214 extends in the axial direction from the distal end of the radial extension part 213. The distal end of the U-shaped part 214 functions as the other connection part that is connected to the drawn out portion 155 of the coil element 130.

The connecting wires 201, 202, and 203 of each of the U, V, and W phases are located outward in the radial direction (outer circumferential side) from the inner circumferential surface of the stator (stator core 20) as shown in FIGS. 9 to 11 and extend between the coil drawn out portions. As shown in FIG. 12, the oblique sections 210 of the connecting wires 201, 202, and 203 of the same phase overlap with the connecting wires 201, 202, and 203 of different phases. More specifically, the connecting wires 201, 202, and 203 of the same phase extend obliquely relative to a plane orthogonal to the axial direction of the stator as the connecting wires 201, 202, and 203 of the same phase overlap with one another in the axial direction. The distal ends of the connecting wires 201, 202, and 203 of the same phase and the corresponding coil drawn out portions (the coil drawn out portions 155) are joined through butt connection by performing tungsten inert gas (TIG) welding.

As described above, the connecting wires 201, 202, and 203 of the same phase extend obliquely as they overlap each other (extend away from the side surface of the stator core) from one connection part (the upright part 212) to the other connection part. The connecting wires 201, 202, and 203 of the same phase extend in the radial direction before one connection part and extend toward the side surface of the stator core in the U-shaped part 214. The other connection part is then bonded to the drawn out portion 155 through butt connection.

Instead of butt-connecting rectangular wires, a round rod may be used as the connecting wire that is butt-connect to a rectangular wire.

In this structure, the connecting wires 201, 202, and 203 of the same phase located inward in the radial direction (inner circumferential side) can be arranged without protruding inside from the inner circumferential surface of the stator (stator core 20). This structure eliminates protrusions formed inward in the radial direction (inner circumferential side) and prevents the stator from interfering with the rotor. Further, there is no need to add height to the connection wires required when the connecting wires 201, 202, and 203 are arranged inward in the radial direction (inner circumferential side). More specifically, the inner connecting wires of the same phase are arranged to extend between the drawn out portions extending in the axial direction in the upper parts of the coil ends and can thus be arranged within the range of the height of the drawn out portions extending in the axial direction to connect separate coil elements arranged in the same slot.

As shown in FIGS. 8A and 8B, the winding number n of the coil element 110 in the first layer is 2, the winding number n of the coil element 120 in the second layer is 2, and the winding number n of the coil element 130 in the third layer is 1. FIGS. 9 to 13 do not show the winding number of each coil element. In the coil elements 110, 120, and 130 that are adjacent in the radial direction of the stator, a coil element located inward in the radial direction of the stator has the same number of winding or has a smaller number of windings than a coil element located outward in the radial direction of the stator. This is because of the reasons described below.

Figure 18:
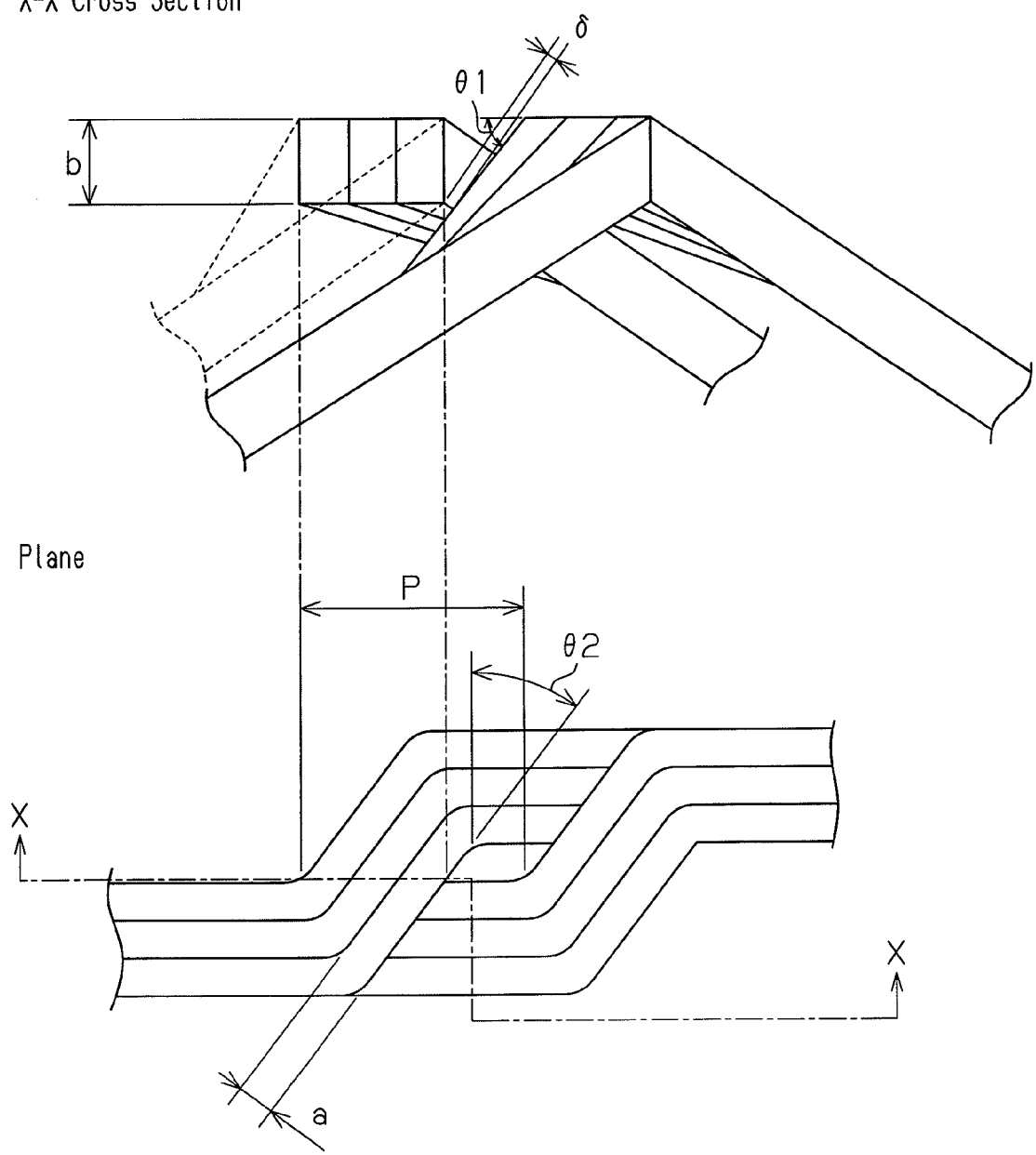
FIG. 18 is a schematic diagram showing the dimensional relationship between coil elements in the coil of FIG. 8A.

FIG. 18 schematically shows the crank-shaped sections of the adjacent coils or winding portions. In FIG. 18, "P" represents the slot pitch, "a" represents the thickness of the rectangular wire, "b" represents the width of the rectangular wire, "n" represents the number of windings (n=3 in FIG. 18), "θ1" represents the angle of the oblique side, and "θ2" represents the angle for changing the slot (the lane change angle). The slot pitch P decreases inward in the circumferential direction of the stator. As a result, the gap δ decreases toward the inner circumferential side of the stator. The gap δ can be increased by reducing the winding number n, increasing the oblique side angle θ1, reducing the slot changing angle θ2, reducing the rectangular wire thickness a, or reducing the rectangular wire width b.

When the oblique side angle θ1, the slot changing angle θ2, the wire thickness a, and the wire width b are constant, the gap δ can be increased by reducing the winding number n.

For the reasons described above, in the coil elements 110, 120, and 130 adjacent in the radial direction of the stator, the number of windings in the conductive wire of the coil element located inward in the radial direction of the stator is the same or smaller than the coil element located outward in the radial direction of the stator. More specifically, the slot pitch P is narrower in coil elements located inward in the radial direction. When coil elements include the same number of windings, the coil element located inward in the radial direction has a smaller gap δ between the winding portions (gap between the coil end part of the first winding portion and the coil end part of the second winding portion). When the coil 100 includes these separate coil elements, and the coil elements located inward in the radial direction has the same number of windings or a smaller number of windings than a coil element located outward in the radial direction, the gap 6 between the winding portions of the coil element located inward in the radial direction increases, and interference is reduced between the winding portions (between the first winding portion and the second winding portion). Further, the coil end height can be decreased.

The winding number n of the coil elements is exemplified here as n=2, n=2, and n=1 for coil elements located outward in the radial direction. Instead, when the total number of windings is six, the winding number n may be n=3, n=2, and n=1 from coil elements located outward in the radial direction to coil elements located inward in the radial direction. Alternatively, the winding number may be n=2, n=2, and n=2.

In addition to the advantages (1) to (6) of the first embodiment, the second embodiment has the advantages described below.

(7) The coil 100 includes the separate coil elements 110, 120, and 130 arranged in the radial direction of the stator. Each of the coil elements is formed to have at least one winding of a conductive wire in the same slot. The separate coil elements facilitate the shaping of the coil. Further, by separating the coil 100, the gap is increased between the coil end part of the first winding portion and the coil end part of the second winding portion, and also between the coil end part of the first winding portion in one of two coils adjacent in the circumferential direction and the coil end part of the second winding portion of the other one of the two adjacent coils. This reduces the limit for the coil end height at which the coils interfere with one another.

(8) The coil elements 110, 120, and 130 include the drawn out portions 151, 152, 153, and 154 connecting the adjacent coil elements. The drawn out portions of the adjacent coil elements are arranged at the same position (in broad terms, at overlapping positions) in the circumferential direction and are joined directly with each other. Direct joining of the separate layers reduces the cost for welding (bonding). Further, by joining the separate coil elements at the same position in the circumferential direction, the height of the joined part can be decreased.

(9) The drawn out portions of the coil elements 110, 120, and 130 include the inner drawn out portions 151, 153, and 155, which are located inward in the radial direction of the stator, and the outer drawn out portions 150, 152, and 154, which are located outward in the radial direction of the stator. The inner drawn out portion 155 in the innermost coil element 130 in the radial direction functions as the offset drawn out portion, which is arranged at a position offset from the other drawn out portions 150 to 154 in the circumferential direction of the stator. The connecting wires 201, 202, and 203 can easily be connected with the offset drawn out portion 155.

(10) The coil 100 is one of a plurality of coils in the same phase adjacent to one another in the circumferential direction of the stator. The offset drawn out portions 155 in the coils of the same phase are connected to each other using the connecting wires 201 to 203 of the same phase. The connecting wires 201, 202, and 203 of the same phase are located outward in the radial direction from the inner circumferential surface of the stator at the axial end surface of the stator and extend between the drawn out portions 151, 152, 153, and 154. The coil 100 includes the connecting wires 201, 202, and 203 respectively corresponding to different phases (U-phase, V-phase, and W-phase). The connecting wires 201, 202, and 203 of the same phase corresponding to each one of the different phases (the U-phase, V-phase, and W-phase) extend obliquely from a plane orthogonal to the axial direction of the stator as the connecting wires overlap with one another in the axial direction of the stator. As a result, the connecting wires 201, 202, and 203 of the same phase can be laid out to connect the coil elements of the same phase. Also, the connecting wires 201, 202, and 203 connecting the coil elements of the different polarities can have the same shape.

(11) In the coil elements 110, 120, and 130 that are adjacent in the radial direction of the stator, a coil element located inward the radial direction of the stator has the same number of windings as or a smaller number of windings than a coil element located outward in the radial direction of the stator. This increases the gap between the coil end part 145 of the first winding portion and the coil end part 148 of the second winding portion and the gap between the coil end part of the first winding portion in one of two coils adjacent in the circumferential direction and the coil end part of the second winding portion in the other one of the two coils. Thus, the coil end height can be designed to be low.

(12) The first winding portion 141 and the second winding portion 142 in the coil elements 110, 120, and 130 of the separate layers are connected to each other so that the slot insertion part 143 and slot insertion part 147 located outward in the circumferential direction are connected to each other by a connecting portion. The drawn out portions 150, 151, 152, 153, 154, and 155 are drawn out from the slot insertion part 144 and slot insertion part 146 located inward in the circumferential direction. As shown in FIG. 8B, the oblique sections extending from the slot insertion parts 144 and 146 located inward in the circumferential direction are at positions lower than the oblique sections extending from the slot insertion parts 143 and 147 located outward in the circumferential direction between the top position of the first winding portion 141 and the top position of the second winding portion 142. As a result, the bent parts for forming the drawn out portions 150, 151, 152, 153, 154, and 155 can also be formed at lower positions. This reduces the height of the joined part of each coil element. The coil 100, which includes the separate coil elements 110, 120, and 130 in each of which the first winding portion 141 and the second winding portion 142 are connected to each other with the connecting portion to connect the outer slot insertion part 143 of the first winding portion 141 and the outer slot insertion part 147 of the second winding portion 142, have a smaller height in the joined part of each coil element as compared with a coil in which the inner slot insertion parts 144 and 146 of the first winding portion 141 and the second winding portion 142 are connected with the connecting portion.

It should be apparent to those skilled in the art that the present invention may be embodied in many other specific forms without departing from the spirit or scope of the invention. Particularly, it should be understood that the present invention may be embodied in the following forms.

The coil may have the structure shown in FIGS. 19A and 19B instead of the structure shown in FIGS. 4A to 4C. In this structure, drawn out portions 72 and 73 are located at the positions shown in FIG. 20 instead of the positions of the drawn out portions shown in FIG. 5. The drawn out portions are located at different positions because a connecting portion 61 is shaped with a different method. More specifically, the coil having the structure shown in FIGS. 19A and 19B and FIG. 20 includes a first winding portion 40 and a second winding portion 50 that are located at the positions opposite to the positions of the winding portions shown in FIGS. 4A, 4B and 4C and FIG. 5.

In the coil 30 in which two coils are connected in parallel shown in FIGS. 19A and 19B, the first winding portion 40 includes a slot insertion part 42 arranged outward in the circumferential direction and a slot insertion part 41 arranged inward in the circumferential direction. The second winding portion 50 has a slot insertion part 51 arranged outward in the circumferential direction and a slot insertion part 52 arranged inward in the circumferential direction.

In FIG. 20, the drawn out portion 72 is drawn out from the slot insertion part 42 located outward in the circumferential direction among the two slot insertion parts 41 and 42 in the first winding portion 40, and the drawn out portion 73 is drawn out from the slot insertion part 51 located outward in the circumferential direction from the two slot insertion parts 51 and 52 in the second winding portion 50.

As shown in FIGS. 19A and 19B, the connecting portion 61 connects the slot insertion part 41 located inward in the circumferential direction of the first winding portion 40 and the slot insertion part 52 located inward in the circumferential direction of the second winding portion 50. The connecting portion 61 extends between a crank-shaped section 46 of the first winding portion 40 and a crank-shaped section 56 of the second winding portion 50.

In the structure shown in FIGS. 19A and 19B and FIG. 20, the coil may be separated into a plurality of layers like in the second embodiment. In this case, the drawn out portions should be drawn out from the winding portions 141 and 142 at positions passing the tops of the winding portions 141 and 142 (the coil end parts 145 and 148).

In the above embodiments, the slot insertion part 41 and the slot insertion part 51 are respectively inserted into adjacent slots, and the slot insertion part 42 and the slot insertion part 52 are respectively inserted into adjacent slots. However, the slot insertion parts do not have to be inserted into adjacent slots.

Figure 21:
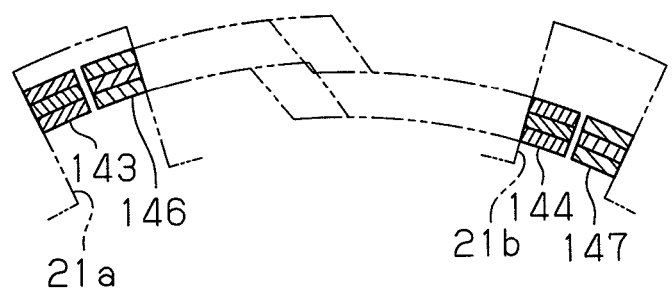
FIG. 21 is a partial cross-sectional view showing a coil in another example.

The coil of the second embodiment (coil divided into separate layers) may have the structure shown in FIG. 21. In the stator in which the number of slots having the same polarity is 1, a slot insertion part 143 of a first winding portion 141 and a slot insertion part 146 of a second winding portion 142 are arranged near each other in the circumferential direction and are inserted into the same slot 21a. A slot insertion part 144 of the first winding portion 141 and a slot insertion part 147 of the second winding portion 142 are arranged near each other in the circumferential direction and are inserted in the same slot 21b. In other words, the slot insertion parts 143 and 146 are inserted in the same slot, and the slot insertion parts 144 and 147 are inserted in the same slot. In this structure, parts of both the first winding portion and the second winding portion are inserted in each single slot.

Figure 22:
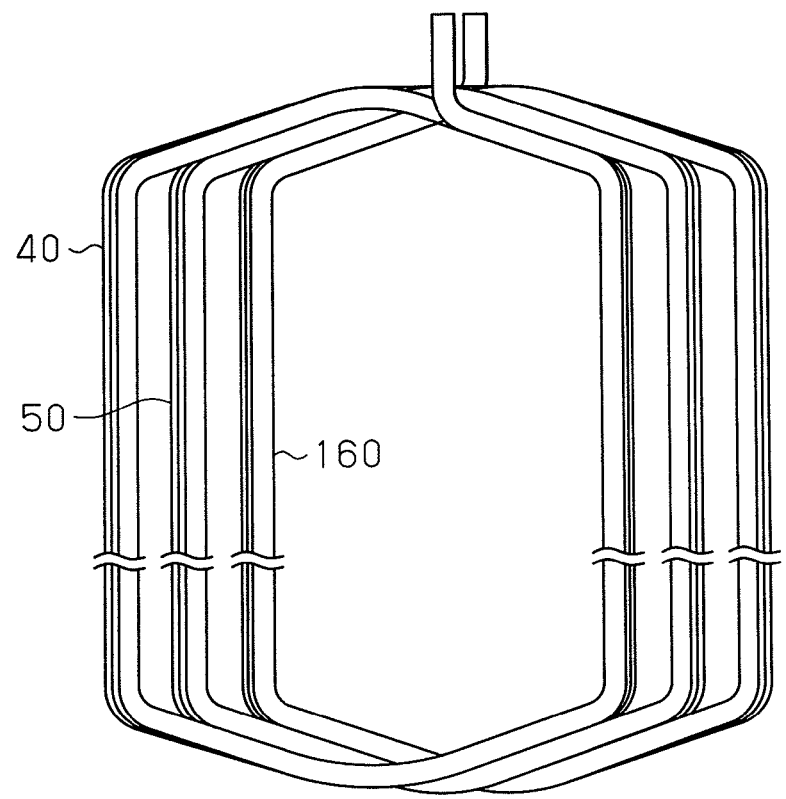
FIG. 22 is a front view showing a coil in another example.

As shown in FIG. 22, the coil may be a single-phase continuous winding coil including two or more slots having the same polarity, each of which has the same connecting portion structure. As shown in FIG. 22, for example, the coil may have a first winding portion 40, a second winding portion 50, and a third winding portion 160. In this manner, the coil may include three winding portions. Although the drawn out portions of this coil shown in FIG. 22 are offset, the drawn out portions may be located at the same position in the circumferential direction.

Although the coil is formed by the three separate coil elements in the second embodiment (FIGS. 8A and 8B), the coil of the second embodiment may include two separate coil portions, four separate coil portions, or more than four separate coil portions.

In the second embodiment (FIGS. 8A and 8B), the positions of the drawn out portions 151, 152, 153, and 154 do not have to be the middle positions in the circumferential direction between the top of the first winding portion 141 (the coil end part 145) and the top of the second winding portion 142 (the coil end part 148). The drawn out portions 151, 152, 153, and 154 may be offset from the tops of the coil ends 145 and 148 in the circumferential direction by a distance other than the distance L1.

In the second embodiment (FIGS. 8A and 8B), the innermost drawn out portion 155 in the radial direction may be offset from the drawn out portions 150 to 154 in the circumferential direction by a distance other than the distance L2 or by a distance other than the one-slot pitch.

In the second embodiment, the innermost drawn out portion 155 in the radial direction is offset from the other drawn out portions 150 to 154 in the circumferential direction as shown in FIGS. 8A and 8B. However, the innermost drawn out portion 155 does not have to be offset.

The present examples and embodiments are to be considered as illustrative and not restrictive, and the invention is not to be limited to the details given herein, but may be modified within the scope and equivalence of the appended claims.

The invention claimed is:

1. A coil arranged in a stator of a rotary electrical machine, wherein the stator includes a stator core having a plurality of slots arranged in a circumferential direction along an inner circumferential surface of the stator core, the coil comprising:
a first winding portion formed by edgewise-winding a conductive rectangular wire, wherein the first winding portion includes two first slot insertion parts, which are respectively arranged in two first slots spaced apart from each other in the circumferential direction, and two first coil end parts, which connect the two first slot insertion parts, and wherein the two first slots are included in the plurality of slots of the stator; and
a second winding portion formed by edgewise-winding a conductive rectangular wire that is connected to the first winding portion, wherein the second winding portion includes two second slot insertion parts, which are respectively arranged in two second slots spaced apart from each other in the circumferential direction, and two second coil end parts, which connect the two second slot insertion parts, and wherein the two second slots are included in the plurality of slots of the stator;
wherein each of the first and second coil end parts includes a crank-shaped section, and the first and second winding portions are formed so that when the first and second slot insertion parts are arranged in the corresponding slots, a long side of a cross-section of the rectangular wire extends in the circumferential direction of the stator and a short side of the cross-section of the rectangular wire extends in a radial direction of the stator, and
wherein, in the first winding portion, the rectangular wire of the two first slot insertion parts is arranged at radially innermost position in each of the corresponding first slot insertion parts in the slots, and in the second winding portion, the rectangular wire of the two second slot insertion parts is arranged at radially innermost position in each of the corresponding second slot insertion parts in the slots.

2. The coil according to claim 1, further comprising a plurality of coil elements that are separated from each other and arranged in a radial direction of the stator, each of the coil elements is formed to include one or more turnings of the conductive wire in a same slot.

3. The coil according to claim 2, wherein
each of the coil elements includes a drawn out portion connected to an adjacent one of the coil elements in the radial direction of the stator, and
the drawn out portions of adjacent coil elements in the radial direction of the stator are arranged at overlapping positions in the circumferential direction of the stator and directly joined with each other.

4. The coil according to claim 3, wherein
the drawn out portion of each of the coil elements includes an inner drawn out portion arranged inward in the radial direction of the stator and an outer drawn out portion arranged outward in the radial direction of the stator, and
the inner drawn out portion of an innermost one of the coil elements in the radial direction is an offset drawn out portion arranged at a position offset in the circumferential direction from the drawn out portions of the other coil elements.

5. The coil according to claim 4, wherein
the coil is one of a plurality of coils that have a same phase and are adjacent to each other in the circumferential direction of the stator,
the offset drawn out portions of the coils of the same phase are connected with each other by a connecting wire of the same phase,
the drawn out portions extend in an axial direction of the stator, and
the connecting wire of the same phase is arranged outward in the radial direction from an inner circumferential surface of the stator on an axial end surface of the stator and extends between the drawn out portions.

6. The coil according to claim 5, wherein
the connecting wire of the same phase is provided with each of a plurality of phases,
the connecting wires corresponding to the plurality of phases extend obliquely relative to a plane orthogonal to the axial direction of the stator in a state in which the connecting wires are overlapped with one another in the axial direction of the stator.

7. The coil according to claim 2, wherein among the coil elements that are adjacent to each other in the radial direction of the stator, the coil element located inward in the radial direction of the stator has a number of windings of the conductive wire that is the same or smaller than that of the coil element located outward in the radial direction of the stator.

8. The coil according to claim 1, wherein one of the two first slot insertion parts and one of the two second slot insertion parts are arranged in different slots, and the other one of the two first slot insertion parts and the other one of the two second slot insertion parts are arranged in different slots.

9. A stator comprising:
a cylindrical stator core including an inner circumferential surface and slots, which open in the inner circumferential surface of the stator core and which are arranged in a circumferential direction; and
the coil according to claim 1 inserted into the slots of the stator core.

10. The coil according to claim 1, wherein, in each of the first winding portion and second winding portion, a surface of the rectangular wire that faces toward radially inner side when the rectangular wire is arranged in one of the two slots faces toward radially inner side and the rectangular wire is arranged in the other of the two slots.

* * * * *